US011320049B2

(12) United States Patent
Nango

(10) Patent No.: US 11,320,049 B2
(45) Date of Patent: May 3, 2022

(54) PISTON RING COMBINATION

(71) Applicant: TPR Co., Ltd., Tokyo (JP)

(72) Inventor: Tetsuya Nango, Tokyo (JP)

(73) Assignee: TPR Co., Ltd., Tokyo (JP)

(*) Notice: Subject to any disclaimer, the term of this patent is extended or adjusted under 35 U.S.C. 154(b) by 0 days.

(21) Appl. No.: 17/265,895

(22) PCT Filed: Oct. 28, 2019

(86) PCT No.: PCT/JP2019/042141
§ 371 (c)(1),
(2) Date: Feb. 4, 2021

(87) PCT Pub. No.: WO2020/100564
PCT Pub. Date: May 22, 2020

(65) Prior Publication Data
US 2021/0164568 A1 Jun. 3, 2021

(30) Foreign Application Priority Data
Nov. 15, 2018 (JP) .............................. JP2018-214957

(51) Int. Cl.
*F16J 9/20* (2006.01)
*F16J 9/06* (2006.01)

(52) U.S. Cl.
CPC ................... *F16J 9/20* (2013.01); *F16J 9/06* (2013.01)

(58) Field of Classification Search
CPC ........ F16J 9/20; F16J 9/06; F16J 9/065; F02F 3/00
See application file for complete search history.

(56) References Cited

U.S. PATENT DOCUMENTS 4,299,401 A * 11/1981 McCormick ............ B23P 15/08
277/440
4,475,739 A * 10/1984 Nakajima .................. F16J 9/00
277/442

(Continued)

FOREIGN PATENT DOCUMENTS

CN 101403348 A 4/2009
CN 106062440 A 10/2016
(Continued)

OTHER PUBLICATIONS

Japanese Patent Application No. 2019-567751, Notice of Reasons for Refusal, dated Mar. 31, 2020.
Japanese Patent Application No. 2019-567751, Decision to Grant, dated Aug. 11, 2020.
International Application No. PCT/JP2019/042141, International Search Report, dated Dec. 17, 2019.
(Continued)

*Primary Examiner* — Eugene G Byrd
(74) *Attorney, Agent, or Firm* — Marshall, Gerstein & Borun LLP

(57) ABSTRACT

In this piston ring combination, a second outer peripheral surface, which is the outer peripheral surface of a second ring, has a second protruding surface curved into a convex shape, and a pair of third outer peripheral surfaces, which are the outer peripheral surfaces of a pair of segments, each have a third outer peripheral area in which a third protruding surface is formed, the third protruding surfaces being curved into convex shapes. In at least one of the pair of third outer peripheral surfaces, the peripheral edge on a crank-chamber side is positioned farther outward in the diametrical direction than the peripheral edge on a combustion-chamber side, and a peak of the third protruding surface is positioned nearer to the crank chamber than the center of the third outer peripheral surface.

22 Claims, 13 Drawing Sheets

(56) References Cited

U.S. PATENT DOCUMENTS

| | | | | |
|---|---|---|---|---|
| 5,490,445 | A * | 2/1996 | Rao | F16J 1/08 |
| | | | | 123/193.6 |
| 7,243,596 | B2 * | 7/2007 | Usui | F16J 9/068 |
| | | | | 92/253 |
| 7,354,045 | B2 * | 4/2008 | Abe | F16J 9/062 |
| | | | | 277/435 |
| 7,854,191 | B2 * | 12/2010 | Kariya | F16J 9/067 |
| | | | | 92/253 |
| 9,784,369 | B2 * | 10/2017 | Fujita | F16J 9/26 |
| 2006/0061043 | A1 * | 3/2006 | Takahashi | F16J 9/068 |
| | | | | 277/434 |
| 2010/0176557 | A1 | 7/2010 | Peter-Klaus et al. | |
| 2015/0167844 | A1 * | 6/2015 | Yabune | F16J 9/068 |
| | | | | 277/477 |
| 2015/0184748 | A1 | 7/2015 | Sytsma et al. | |
| 2017/0175893 | A1 | 6/2017 | Fujita et al. | |
| 2019/0360585 | A1 * | 11/2019 | Kawano | F16J 9/068 |
| 2020/0040995 | A1 * | 2/2020 | Fushimi | F16J 9/22 |
| 2020/0325844 | A1 * | 10/2020 | Urabe | F16J 9/12 |

FOREIGN PATENT DOCUMENTS

| | | |
|---|---|---|
| EP | 2045488 A1 | 4/2009 |
| EP | 3460224 A1 | 3/2019 |
| JP | S59-184346 U | 12/1984 |
| JP | 2001-241357 A | 9/2001 |
| JP | 2005-273583 A | 10/2005 |
| JP | 2009-091927 A | 4/2009 |
| JP | 2010-530045 A | 9/2010 |
| JP | 2012-215238 A | 11/2012 |
| JP | 2014-098473 A | 5/2014 |
| JP | 2018-009705 A | 1/2018 |
| WO | WO-2017/209135 A1 | 12/2017 |

OTHER PUBLICATIONS

Extended European Search Report in EP Application No. 19884091.0 dated Nov. 18, 2021, 10 pages.

Office Action in CN Application No. 201980060459.1 dated Oct. 18, 2021, 13 pages.

* cited by examiner

PISTON RING COMBINATION

TECHNICAL FIELD

The present invention relates to a piston ring combination.

BACKGROUND ART

An internal combustion engine that is mounted in a standard vehicle adopts a configuration where three piston rings are provided on a piston that is mounted in a cylinder, the three piston rings combining two compression rings (pressure rings) including a top ring and a second ring and one oil ring. These three piston rings include the top ring, the second ring, and the oil ring in the stated order from an upper side (a combustion chamber side), the rings being mounted in ring grooves formed on an outer peripheral surface of the piston to slide on a cylinder inner wall surface. The oil ring farthest from the combustion chamber includes an oil seal function for suppressing oil from flowing out to the combustion chamber side (i.e. oil rise) by scraping off excess engine oil (lubricant oil) attached to the cylinder inner wall surface to a crankcase side, and a function for preventing seizure of the piston caused by operation of the internal combustion engine by adjusting the amount of oil such that a lubricant oil film is appropriately maintained on the cylinder inner wall surface. The compression rings include a gas seal function for suppressing flowing (blowby) of combustion gas from the combustion chamber side to the crankcase side by maintaining airtightness, and an oil seal function for suppressing oil rise by scraping off excess oil that is not scraped off by the oil ring. Such a piston ring combination achieves reduced blowby gas and reduced oil consumption in the internal combustion engine.

In relation to the above, Patent document 1 and Patent document 2 each disclose a piston ring combination including a vertically symmetrical barrel-shaped top ring, a tapered second ring, and an oil ring provided with a vertically symmetrical barrel-shaped or straight segment. With the piston ring combinations disclosed in Patent document 1 and Patent document 2, oil consumption of the internal combustion engine is reduced by using a second ring, an outer peripheral surface of which has a tapered shape that is superior in oil sealing, in combination with the oil ring.

CITATION LIST

Patent Literature

[Patent document 1] Japanese Patent Laid-Open No. 2001-241357
[Patent document 2] Japanese Patent Laid-Open No. 2012-215238

SUMMARY OF INVENTION

Technical Problem

To reduce fuel consumption of an internal combustion engine, it is important to reduce friction generated between an outer peripheral surface (a sliding surface) of each piston ring and a cylinder inner wall, and to reduce friction loss of the internal combustion engine. However, the tapered shape mentioned above achieves excellent performance in relation to oil sealing, but tends to be disadvantageous in reducing friction. Accordingly, a piston ring combination that is capable of better reducing the friction loss is desired, but achieving oil seal performance at the same time is difficult.

The present invention has been made in view of the above circumstances, and an object thereof is to provide a technology regarding a piston ring combination that is capable of reducing friction loss while securing oil seal performance.

Solution to Problem

To solve the problems described above, the present invention adopts the following means. That is, the present invention is a piston ring combination including a top ring, a second ring, and an oil ring that are mounted in ring grooves formed on a piston of an internal combustion engine, where a first outer peripheral surface that is an outer peripheral surface of the top ring includes a first outer peripheral region where a first protruding surface is formed, the first protruding surface being curved outward into a convex shape in a radial direction of the top ring in a cross-section perpendicular to a circumferential direction of the top ring, the convex shape having a peak at an outermost position of the first outer peripheral surface in the radial direction of the top ring, a second outer peripheral surface that is an outer peripheral surface of the second ring includes a second outer peripheral region where a second protruding surface is formed, the second protruding surface being curved outward into a convex shape in a radial direction of the second ring in a cross-section perpendicular to a circumferential direction of the second ring, the convex shape having a peak at an outermost position of the second outer peripheral surface in the radial direction of the second ring, the oil ring includes a pair of segments, each provided on a corresponding side in an axial direction, and an expander-spacer that biases the pair of segments outward in a radial direction, a pair of third outer peripheral surfaces that are outer peripheral surfaces of the pair of segments each include a third outer peripheral region where a third protruding surface is formed, the third protruding surface being curved outward into a convex shape in the radial direction of the oil ring in a cross-section perpendicular to a circumferential direction of the oil ring, the convex shape having a peak at an outermost position of the third outer peripheral surface in the radial direction of the oil ring, and in relation to at least one of the pair of third outer peripheral surfaces, a peripheral edge of the third outer peripheral region on a crankcase side is positioned more outward in the radial direction than a peripheral edge on a combustion chamber side, and the peak of the third protruding surface is positioned closer to a crankcase than a center of the third outer peripheral surface in the axial direction of the oil ring.

In relation each of the piston rings, the top ring, the second ring and the oil ring, "outer peripheral surface" refers to a surface that connects outer peripheral edges of two end surfaces in the axial direction that define a width (a dimension in the axial direction) of the ring (or the segment or a rail). Unless particularly specified, "circumferential direction" refers to a circumferential direction of the corresponding piston ring. Unless particularly specified, "radial direction" refers to a radial direction of the corresponding piston ring. "Inner side" or "inward in radial direction" refers to an inner peripheral surface side of the corresponding piston ring, and "outer side" or "outward in radial direction" refers to an opposite side (that is, an outer peripheral surface side of the piston ring). Unless particularly specified, "axial direction" refers to a direction along a center axis of the corresponding piston ring.

According to the present invention, the second ring slidingly contacts an inner wall of a cylinder through the second protruding surface that is curved outward into a convex shape in the radial direction. That is, the second ring slidingly contacts the inner wall of the cylinder through a barrel-shaped outer peripheral surface. Accordingly, friction that is generated against the cylinder inner wall may be reduced compared with a case where the outer peripheral surface is tapered. Additionally, "barrel shape" refers to a shape of an outer peripheral surface that is curved outward into a convex shape in the radial direction in a cross-section perpendicular to the circumferential direction of the piston ring, and shapes of such an outer peripheral surface include a symmetrical barrel shape, an eccentric barrel shape, and a tapered barrel shape. "Symmetrical barrel shape" is a shape of an outer peripheral surface where a peak of the convex shape is positioned at a center of the outer peripheral surface in the axial direction (i.e. at a center of a ring width). "Eccentric barrel shape" is a shape of an outer peripheral surface where a peak of the convex shape is positioned closer to a crankcase than the center of the outer peripheral surface in the axial direction. Furthermore, "tapered barrel shape" is an eccentric barrel shape, and is a shape of an outer peripheral surface having a tapered shape where a diameter is linearly reduced toward the combustion chamber side from a shape on the crankcase side that is curved outward into a convex shape in the radial direction in the cross-section perpendicular to the circumferential direction of the piston ring. Shapes of the second outer peripheral region of the second ring according to the present invention may include the barrel shape, the eccentric barrel shape, and the tapered barrel shape. Furthermore, shapes of the first outer peripheral region of the top ring may include the symmetrical barrel shape and the eccentric barrel shape.

When the second ring slidingly contacts the inner wall of the cylinder through a barrel-shaped outer peripheral surface, oil seal performance of the second ring tends to be reduced compared with a case of a tapered shape; however, with the present invention, the pair of third outer peripheral surfaces that are outer peripheral surfaces of the pair of segments provided on the oil ring each include the third outer peripheral region where the third protruding surface is formed, the third protruding surface being curved outward into a convex shape in the radial direction of the oil ring in the cross-section perpendicular to the circumferential direction of the oil ring, the convex shape having the peak at the outermost position of the third outer peripheral surface in the radial direction of the oil ring, and in relation to at least one third outer peripheral surface of the pair of third outer peripheral surfaces, the peripheral edge of the third outer peripheral region on the crankcase side is positioned more outward in the radial direction than the peripheral edge on the combustion chamber side, and the peak of the third protruding surface is positioned closer to the crankcase than the center of the third outer peripheral surface in the axial direction. Accordingly, with the segment, a barrel width on the crankcase side is smaller than a barrel width on the combustion chamber side, and a distance between the peak of the third outer peripheral region and a lower edge of the third outer peripheral region in the axial direction is smaller than a distance between the peak and an upper edge of the third outer peripheral region in the axial direction. Accordingly, a gap between the inner wall of the cylinder and the third outer peripheral region may be made smaller on the crankcase side than on the combustion chamber side with the peak as the boundary. Therefore, oil may be appropriately scraped off at the time of lowering of the piston, and at the time of rising of the piston, the third outer peripheral surface runs on the oil due to wedge effect, and thus, oil may be prevented from being scraped upward. Accordingly, oil in a piston clearance is prevented from easily flowing from the crankcase side to the combustion chamber side through the gap on the crankcase side, and oil rise may be better prevented. As a result, the oil seal performance may be increased compared with a case of the symmetrical barrel shape where the peak is at the center of the segment in the axial direction. Shapes of such a third outer peripheral region may include the eccentric barrel shape and the tapered barrel shape.

"Barrel width on the combustion chamber side" of the segment refers to a distance in the radial direction between the peak of the third outer peripheral region and an edge of the third outer peripheral region on the combustion chamber side, and is equal to a distance from the inner wall of the cylinder to the edge of the third outer peripheral region on the combustion chamber side in a state where the oil ring is mounted in the ring groove. Furthermore, "barrel width on the crankcase side" of the segment refers to a distance in the radial direction between the peak of the third outer peripheral region and an edge of the third outer peripheral region on the crankcase side, and is equal to a distance from the inner wall of the cylinder to an edge of the segment on the crankcase side in the state where the oil ring is mounted in the ring groove.

As described above, the present invention increases the oil seal performance of the oil ring while reducing friction of the second ring. According to such a piston ring combination, friction loss may be reduced while securing the oil seal performance.

Additionally, the oil ring according to the present invention may be a so-called three-piece oil ring including a pair of separate segments, and an expander-spacer that biases the segments toward the inner wall of the cylinder, or may be a so-called two-piece oil ring including an oil ring main body integrating a pair of rails corresponding to the pair of segments, and a coil expander that biases the oil ring main body toward the inner wall of the cylinder. That is, according to the present invention, the oil ring may include a ring main body including a pair of rails, each on a corresponding side in an axial direction, and a coil expander that biases the ring main body outward in a radial direction, a pair of third outer peripheral surfaces that are outer peripheral surfaces of the pair of rails may each include a third outer peripheral region where a third protruding surface is formed, the third protruding surface being curved outward into a convex shape in the radial direction of the oil ring in a cross-section perpendicular to a circumferential direction of the oil ring, the convex shape having a peak at an outermost position of the third outer peripheral surface in the radial direction of the oil ring, and in relation to at least one of the pair of third outer peripheral surfaces, a peripheral edge of the third outer peripheral region on a crankcase side may be positioned more outward in the radial direction than a peripheral edge on a combustion chamber side, and the peak of the third protruding surface may be positioned closer to a crankcase than a center of the third outer peripheral surface in the axial direction of the oil ring.

Furthermore, according to the present invention, in relation to both of the pair of third outer peripheral surfaces, the peripheral edge of the third outer peripheral region on the crankcase side may be positioned more outward in the radial direction than the peripheral edge on the combustion chamber side, and the peak of the third protruding surface may be positioned closer to the crankcase than the center of the third outer peripheral surface in the axial direction of the oil ring. This may increase the oil seal performance of both of the pair of third outer peripheral surfaces, and thus, oil consumption of the internal combustion engine may be reduced compared with a case where the third outer peripheral region of only one of the third outer peripheral surfaces is eccentrically barrel-shaped.

Furthermore, the third outer peripheral region may include, between the third protruding surface and the peripheral edge on the combustion chamber side, a curved surface that is, in the cross-section perpendicular to the circumferential direction of the oil ring, curved outward into a convex shape in the radial direction of the oil ring, the curved surface having a diameter that is gradually reduced toward the combustion chamber side. Shapes of such a third outer peripheral region may include the eccentric barrel shape. This may increase the wedge effect of the third outer peripheral region at the time of rising of the piston, and upward scraping of oil may be further suppressed.

Furthermore, the third outer peripheral region may include, between the third protruding surface and the peripheral edge on the combustion chamber side, a tapered surface that has a diameter that is gradually reduced toward the combustion chamber side. Shapes of such a third outer peripheral region may include the tapered barrel shape.

Furthermore, according to the present invention, of the second outer peripheral surface that is the outer peripheral surface of the second ring, a peripheral edge of the second outer peripheral region on the crankcase side may be positioned more outward in the radial direction than a peripheral edge on the combustion chamber side, and the peak of the second protruding surface may be positioned closer to the crankcase than a center of the second outer peripheral surface in an axial direction of the second ring. Shapes of such a second outer peripheral region may include the eccentric barrel shape and the tapered barrel shape. A gap formed on the crankcase side in the second ring, between the inner wall of the cylinder and the second outer peripheral region of the second ring, may thus be made smaller than a gap on the combustion chamber side. Accordingly, oil may be prevented from flowing from the crankcase side to the combustion chamber side through the gap on the crankcase side. As a result, the oil seal performance of the second ring may be increased, and oil consumption of the internal combustion engine may be further reduced.

Furthermore, the second outer peripheral region may include, between the second protruding surface and the peripheral edge on the combustion chamber side, a curved surface that is, in the cross-section perpendicular to the circumferential direction of the second ring, curved outward into a convex shape in the radial direction of the second ring, the curved surface having a diameter that is gradually reduced toward the combustion chamber side. Shapes of such a second outer peripheral region may include the eccentric barrel shape. This may increase the wedge effect of the second outer peripheral region at the time of rising of the piston, and upward scraping of oil may be further suppressed.

Furthermore, the second outer peripheral region may include, between the second protruding surface and the peripheral edge on the combustion chamber side, a tapered surface that has a diameter that is gradually reduced toward the combustion chamber side. Shapes of such a second outer peripheral region may include the tapered barrel shape.

Furthermore, of the first outer peripheral surface, a peripheral edge of the first outer peripheral region on the crankcase side may be positioned more outward in the radial direction than a peripheral edge on the combustion chamber side, and the peak of the first protruding surface may be positioned closer to the crankcase than a center of the first outer peripheral surface in an axial direction of the top ring.

Furthermore, the first outer peripheral region may include, between the first protruding surface and the peripheral edge on the combustion chamber side, a curved surface that is, in the cross-section perpendicular to the circumferential direction of the top ring, curved outward into a convex shape in the radial direction of the top ring, the curved surface having a diameter that is gradually reduced toward the combustion chamber side.

Advantageous Effects of Invention

According to the present invention, a piston ring combination is able to reduce friction loss while securing oil seal performance.

DESCRIPTION OF EMBODIMENTS

Hereinafter, preferred embodiments of a piston ring combination according to the present invention will be described with reference to the drawings. Additionally, configurations described in the following embodiments are not intended to limit the technical scope of the invention unless stated otherwise.

First Embodiment

Figure 1:
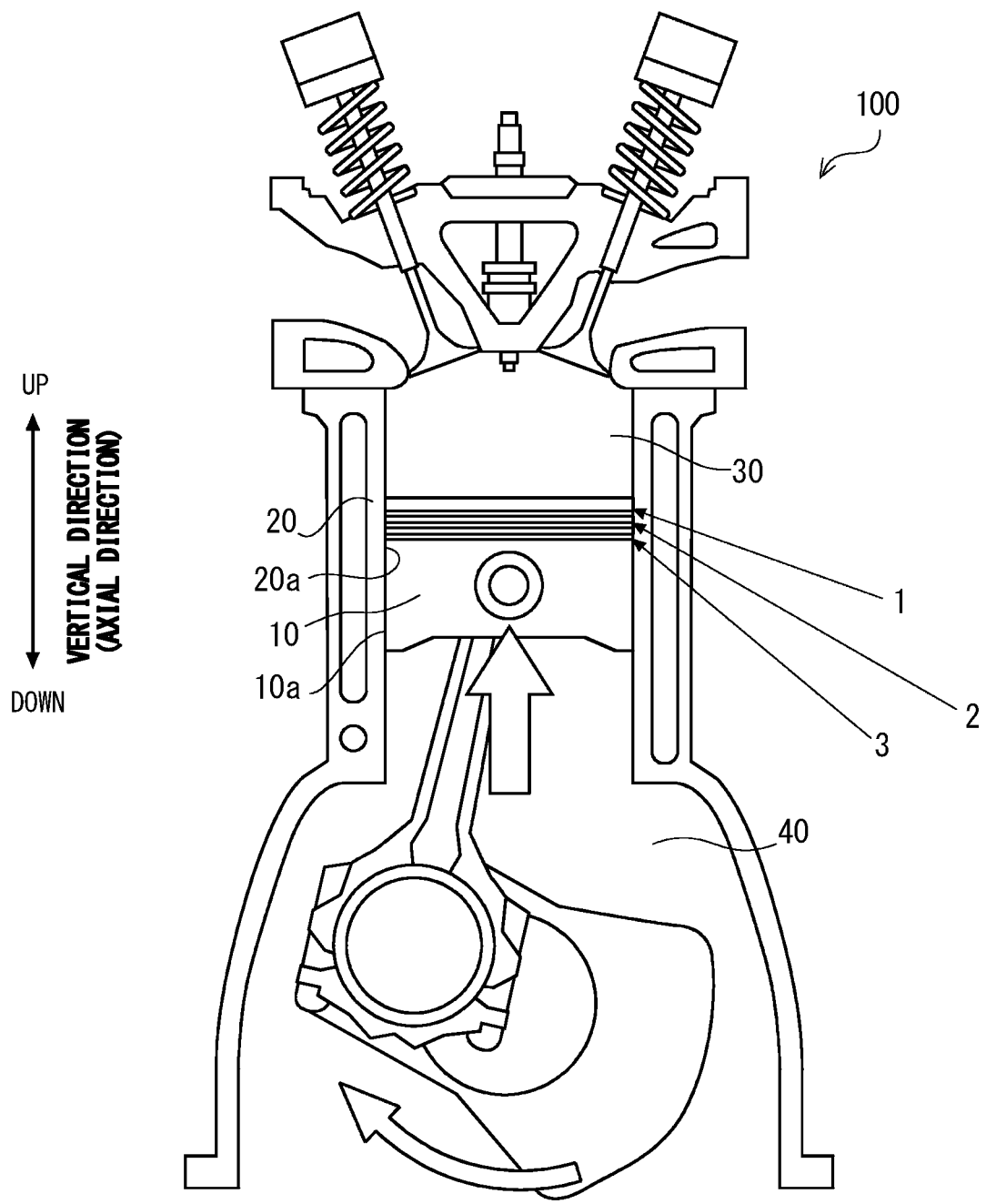
FIG. 1 is an overall view of an internal combustion engine provided with a piston ring combination of a first embodiment.
Figure 2:
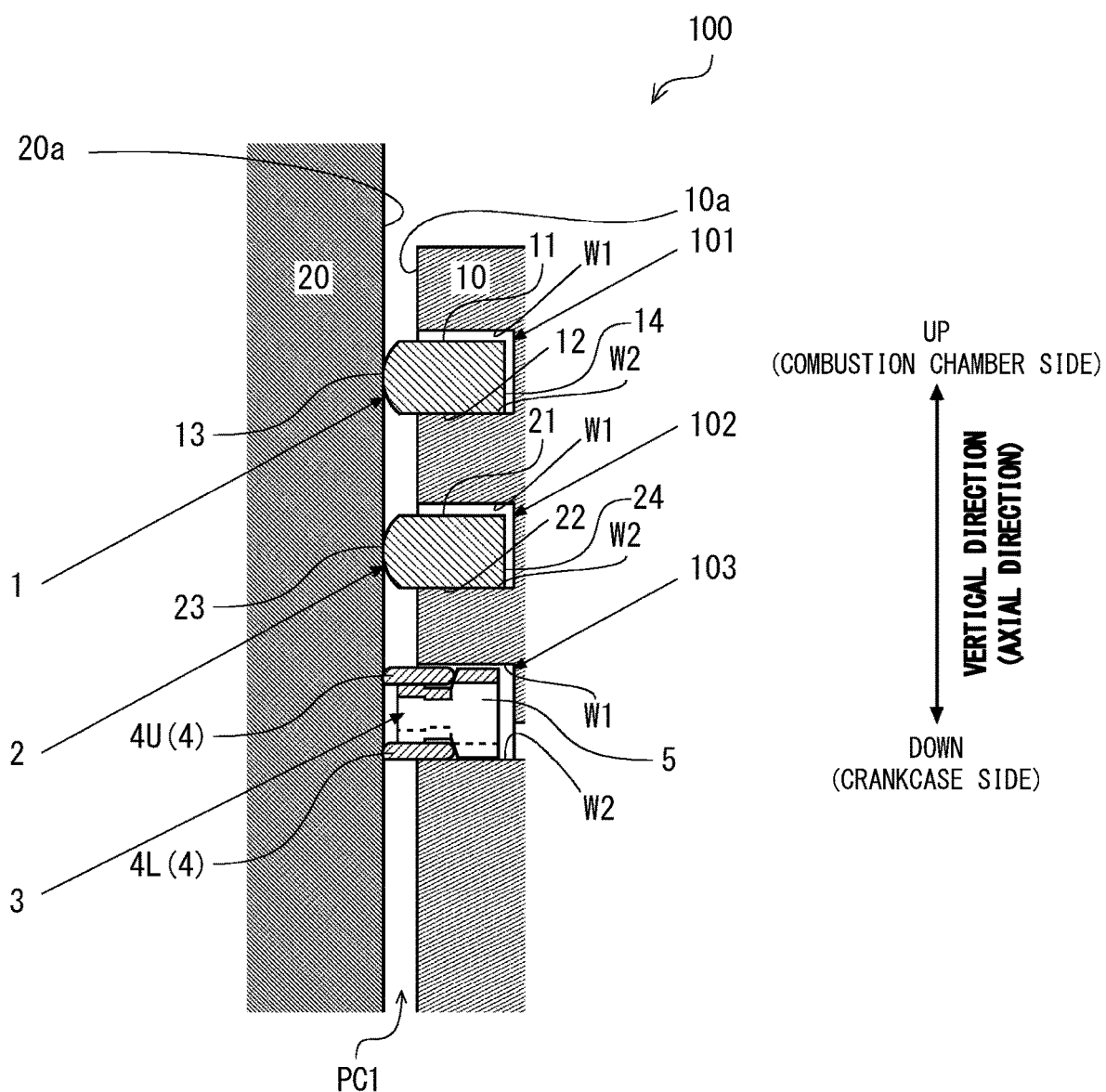
FIG. 2 is an enlarged view of and around ring grooves of the internal combustion engine according to the first embodiment.
Figure 3:
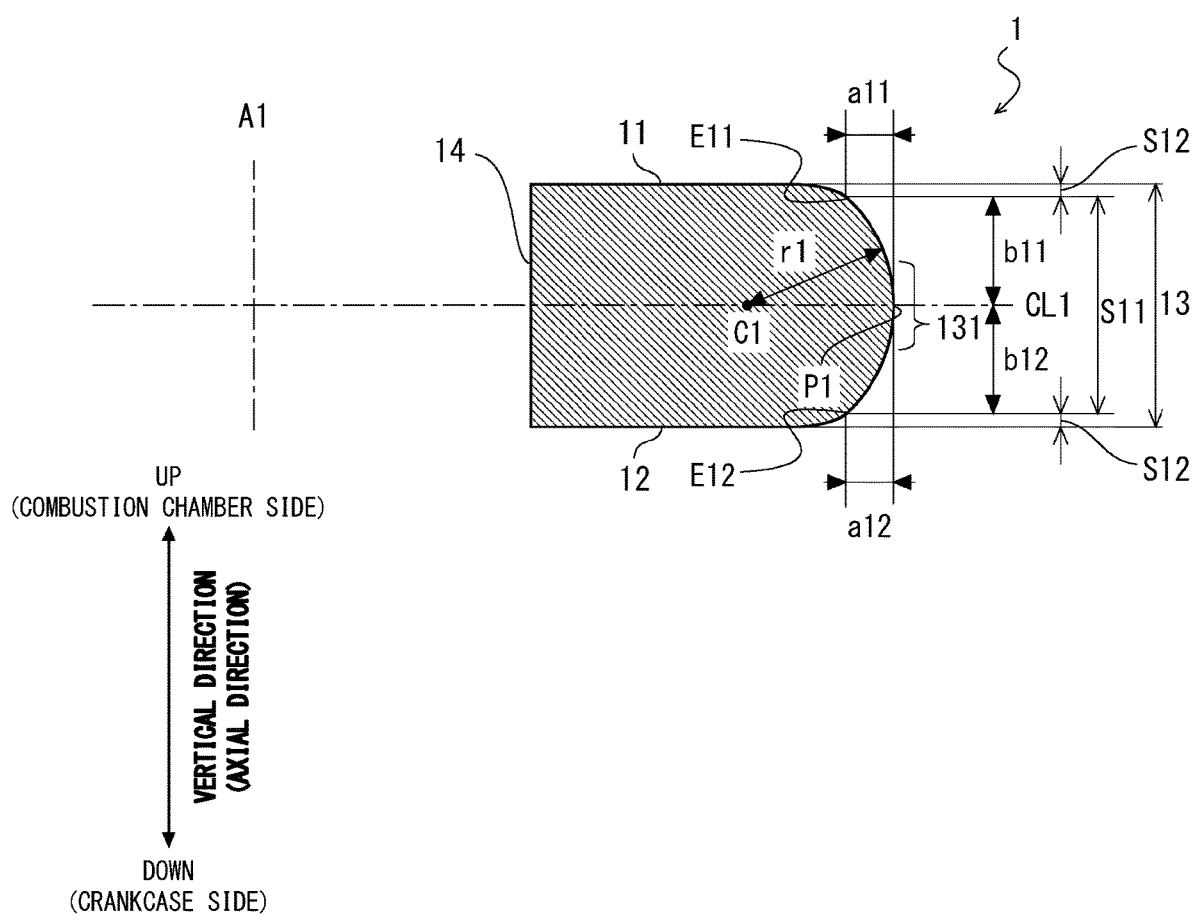
FIG. 3 is a cross-sectional view, perpendicular to a circumferential direction, of a top ring according to the first embodiment.
Figure 4:
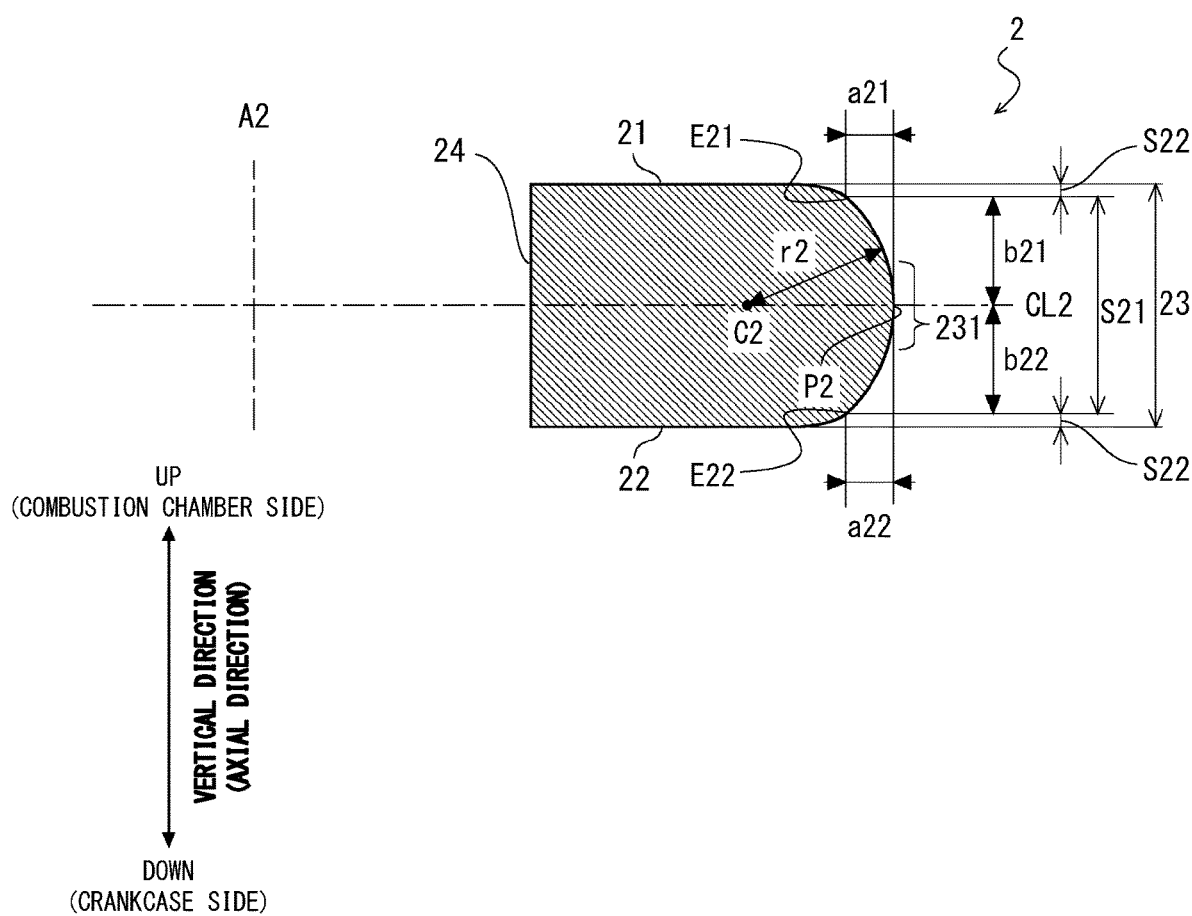
FIG. 4 is a cross-sectional view, perpendicular to a circumferential direction, of a second ring according to the first embodiment.
Figure 5:
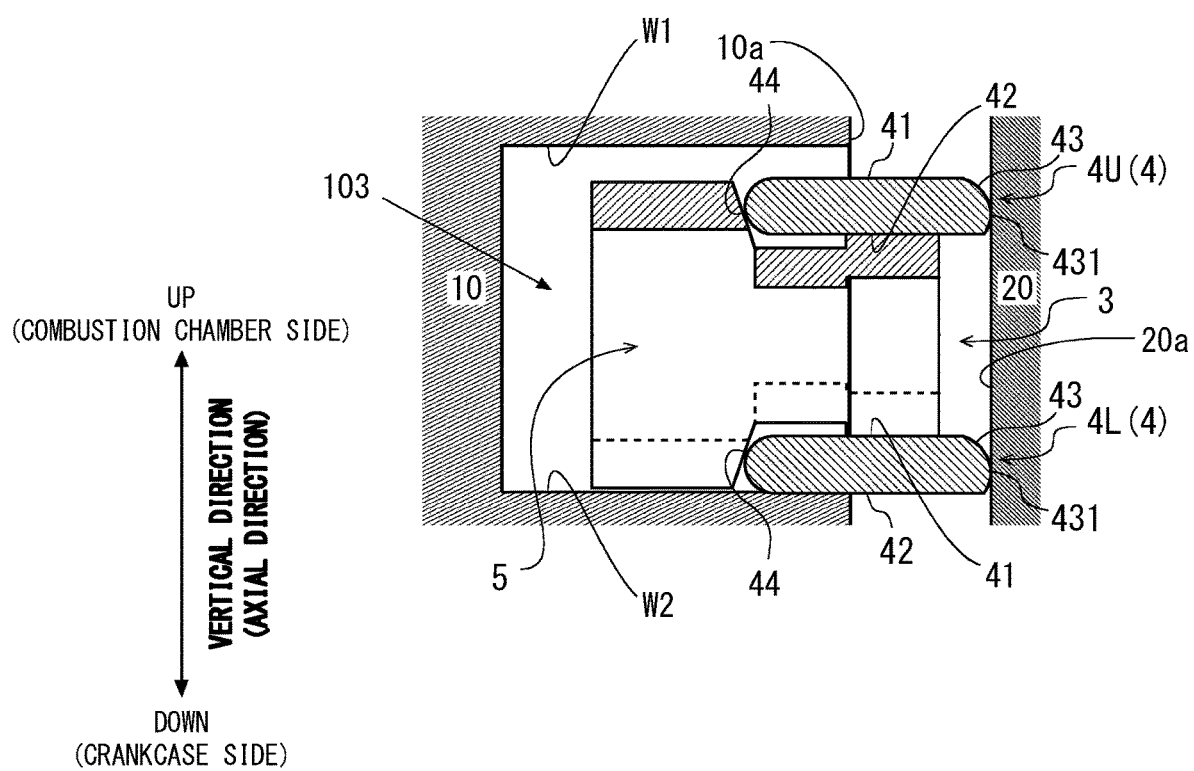
FIG. 5 is a cross-sectional view, perpendicular to a circumferential direction, of an oil ring according to the first embodiment.

FIG. 1 is an overall view of an internal combustion engine 100 provided with a piston ring combination according to a first embodiment. FIG. 2 is an enlarged view of and around ring grooves of the internal combustion engine 100. FIGS. 1 and 2 illustrate each structure in a simplified manner for the sake of convenience. FIG. 3 is a cross-sectional view, perpendicular to a circumferential direction, of a top ring 1 according to the first embodiment. FIG. 4 is a cross-sectional view, perpendicular to a circumferential direction, of a second ring 2 according to the first embodiment. FIG. 5 is a cross-sectional view, perpendicular to a circumferential direction, of an oil ring 3 according to the first embodiment. FIG. 5 illustrates a state where the oil ring 3 is provided in a ring groove. As illustrated in FIG. 1, the internal combustion engine 100 according to the embodiment includes a cylinder 20, and a piston 10 mounted in the cylinder 20. In the following, an axial direction of the cylinder 20 of the internal combustion engine 100 will be defined as "vertical direction". Furthermore, a combustion chamber 30 side in the axial direction of the cylinder 20 will be defined as "upper side" (an up direction in FIG. 1), and the opposite side (that is, a crankcase 40 side) will be defined as "lower side".

As illustrated in FIG. 2, with the internal combustion engine 100, a predetermined distance is secured between a piston outer peripheral surface 10a and a cylinder inner wall 20a, and a gap (a piston clearance) PC1 is thus formed. Furthermore, a top ring groove 101, a second ring groove 102, and an oil ring groove 103 are formed on the piston outer peripheral surface 10a in the stated order in an axial direction of the piston 10 from the upper side, with predetermined gaps therebetween. The top ring 1, the second ring 2, and the oil ring 3 are seated in the top ring groove 101, the second ring groove 102, and the oil ring groove 103, respectively. In the following description, when not distinguishing between the three, the top ring groove 101, the second ring groove 102, and the oil ring groove 103 will be simply referred to as "ring groove(s)". Furthermore, of inner walls that are formed in each ring groove and that vertically face each other, an inner wall on the upper side will be referred to as "upper wall W1", and an inner wall on the lower side will be referred to as "lower wall W2". Moreover, when not distinguishing between the three, the top ring 1, the second ring 2, and the oil ring 3 will be simply referred to as "piston ring(s)". A state as illustrated in FIG. 2 where each piston ring is provided in the corresponding ring groove of the piston 10 mounted in the cylinder 20 will be referred to as "used state". Each piston ring is self-tensioning and an outer peripheral surface thereof is pressed against the cylinder inner wall 20a in the used state.

Furthermore, in the description of each piston ring (or a segment or a rail), "outer peripheral surface" refers to a surface that connects outer peripheral edges of two end surfaces in the axial direction that define a width (a dimension in the axial direction) of the piston ring (or the segment or the rail). Unless particularly specified, "circumferential direction" refers to a circumferential direction of the corresponding piston ring. Unless particularly specified, "radial direction" refers to a radial direction of the corresponding piston ring. "Inner side" or "inward in radial direction" refers to an inner peripheral surface side of the corresponding piston ring, and "outer side" or "outward in radial direction" refers to an opposite side (that is, an outer peripheral surface side of the piston ring). Unless particularly specified, "axial direction" refers to a direction along a center axis of the corresponding piston ring. The axial direction of each piston ring in the used state coincides with the vertical direction of the internal combustion engine 100, or in other words, the axial direction of the cylinder 20. In relation to each piston ring, the upper wall W1 side (that is, the combustion chamber side) of the ring groove will be defined as "upper side", and the lower wall W2 side (that is, the crankcase side) of the ring groove will be defined as "lower side".

A shape of each piston ring of the piston ring combination according to the first embodiment will be described below. Additionally, in the present specification, "barrel shape" refers to a shape of an outer peripheral surface that is, in a cross-section perpendicular to the circumferential direction of the piston ring, curved outward into a convex shape in the radial direction, and includes a symmetrical barrel shape, an eccentric barrel shape, and a tapered barrel shape. "Symmetrical barrel shape" is a shape of an outer peripheral surface where a peak of the convex shape is positioned at a center of the outer peripheral surface in the axial direction (i.e. a center of a ring width). "Eccentric barrel shape" is a shape of an outer peripheral surface where a peak of the convex shape is positioned closer to the crankcase than the center of the outer peripheral surface in the axial direction (i.e. the center of the ring width). Furthermore, "tapered barrel shape" is an eccentric barrel shape, and is a shape of an outer peripheral surface having a tapered shape where a diameter is linearly reduced toward the combustion chamber side from a shape on the crankcase side that is curved outward into a convex shape in the radial direction in the cross-section perpendicular to the circumferential direction of the piston ring. Details of the symmetrical barrel shape, the eccentric barrel shape, and the tapered barrel shape will be given later.

(Top Ring)

First, the top ring 1 according to the first embodiment will be described. As illustrated in FIGS. 2 and 3, the top ring 1 includes a ring upper surface 11, a ring lower surface 12, a ring outer peripheral surface 13, and a ring inner peripheral surface 14. In the used state of the top ring 1, the ring upper surface 11 faces the upper wall W1 of the top ring groove 101, the ring lower surface 12 faces the lower wall W2, and the ring outer peripheral surface 13 slidingly contacts the cylinder inner wall 20a.

As illustrated in FIG. 3, the ring outer peripheral surface 13 includes a first outer peripheral region S11 that is formed outward into a convex shape in the radial direction of the top ring 1, and a pair of connection regions S12, S12 that connects the first outer peripheral region S11 to the ring upper surface 11 and the ring lower surface 12. One of the pair of connection regions S12, S12 connects a peripheral edge (hereinafter "upper edge") E11 on the upper side (the combustion chamber 30 side) of the first outer peripheral region S11 and a peripheral edge (hereinafter "outer edge") on an outer side of the ring upper surface 11 in the radial direction. The other of the pair of connection regions S12, S12 connects a peripheral edge (hereinafter "lower edge") E12 on the lower side (the crankcase 40 side) of the first outer peripheral region S11 and an outer edge of the ring lower surface 12. The first outer peripheral region S11 includes a first protruding surface 131 that is, in a cross-section perpendicular to the circumferential direction of the top ring 1, curved outward into a convex shape in the radial direction of the top ring 1. A peak P1 of the convex shape of the first protruding surface 131 is at an outermost position of the ring outer peripheral surface 13 in the radial direction of the top ring 1. More specifically, the first outer peripheral region S11 of the ring outer peripheral surface 13 is, as a whole, formed into a symmetrical barrel-shaped curved surface. That is, the first outer peripheral region S11 has a symmetrical barrel shape that is symmetrical in the axial direction across the peak P1, with the first protruding surface 131 forming an arc that protrudes outward into a convex shape in the radial direction in the cross-section perpendicular to the circumferential direction and the peak P1 of the convex shape being positioned at a center of the ring outer peripheral surface 13 in the axial direction (the vertical direction). An upper end of the arc is connected to the connection region S12 on the upper side, and a lower end of the arc is connected to the connection region S12 on the lower side. The peak P1 is at an outermost position of the ring outer peripheral surface 13 in the radial direction, and the peak P1 slidingly contacts the cylinder inner wall 20a in the used state. A region of the first outer peripheral region S11 including the peak P1 forms the first protruding surface 131. A reference sign "CL1" in FIG. 3 indicates a straight line that is, in the cross-section, perpendicular to a center axis A1 of the top ring 1 and that passes through the center of the ring outer peripheral surface 13 in the axial direction, or in other words, the center of the ring width (a dimension of the ring in the axial direction). The symmetrical barrel-shaped curved surface forming the first outer peripheral region S11 may also be seen as a curved surface that is formed by causing an arc having a predetermined radius r1, a center C1 of which is on the center line CL1 and on the inner side than the ring outer peripheral surface 13 in the radial direction, to revolve around the center axis A1. As illustrated in FIG. 3, the peak P1 is positioned on the center line CL1. The ring outer peripheral surface 13 is an example of "first outer peripheral surface" according to the present invention. Additionally, in the present example, the first outer peripheral region S11 is formed by an arc having a uniform radius, but the first outer peripheral region S11 is not limited to such a shape. The ring outer peripheral surface 13 does not have to have a symmetrical barrel shape so long as it is barrel-shaped. That is, the peak P1 does not have to be positioned at the center of the ring outer peripheral surface 13 in the axial direction (that is, on the center line CL1), and the peak P1 may be offset to the combustion chamber 30 side or the crankcase 40 side. That is, it suffices if the ring outer peripheral surface 13 has the first protruding surface 131 that is curved outward into a convex shape in the radial direction. In the cross-section perpendicular to the circumferential direction, the first protruding surface 131 does not have to have an arc shape with a uniform radius, and may alternatively have a curved shape where a plurality of arcs having different radii are joined continuously in a manner protruding outward in the radial direction. Furthermore, the first outer peripheral region S11 may include a flat region. For example, the first protruding surface 131 may include, at the peak P1, a flat portion that is parallel to the axial direction. Moreover, the top ring 1 does not have to include the pair of connection regions S12, S12, and the first outer peripheral region S11 may be joined continuously to the ring upper surface 11 and the ring lower surface 12. That is, the entire region of the ring outer peripheral surface 13 may be taken as the first outer peripheral region S11.

Reference signs "a11" and "a12" in FIG. 3 each indicate a barrel width. "a11" indicates a barrel width of the ring outer peripheral surface 13 on the combustion chamber 30 side, or in other words, a distance in the radial direction between the peak P1 of the ring outer peripheral surface 13 and the upper edge E11 of the first outer peripheral region S11. "a11" is equal to a distance from the cylinder inner wall 20a to the upper edge E11 of the first outer peripheral region S11 in the used state. In the same manner, "a12" is a barrel width of the ring outer peripheral surface 13 on the crankcase 40 side, or in other words, a distance in the radial direction between the peak P1 of the ring outer peripheral surface 13 and the lower edge E12 of the first outer peripheral region S11. "a12" is equal to a distance from the cylinder inner wall 20a to the lower edge E12 of the first outer peripheral region S11 in the used state. In the present example, the first outer peripheral region S11 is formed as a symmetrical barrel-shaped curved surface, and thus, the upper edge E11 and the lower edge E12 of the first outer peripheral region S11 coincide with each other in the radial direction. Accordingly, "a11" and "a12" are equal to each other. However, it is not limited to this. Moreover, a reference sign "b11" in FIG. 3 indicates a distance in the axial direction between the peak P1 of the ring outer peripheral surface 13 and the upper edge E11 of the first outer peripheral region S11. Furthermore, "b12" indicates a distance in the axial direction between the peak P1 of the ring outer peripheral surface 13 and the lower edge E12 of the first outer peripheral region S11. In the present example, the first outer peripheral region S11 is formed as a symmetrical barrel-shaped curved surface, and thus, "b11" and "b12" are equal to each other. However, it is not limited to this.

(Second Ring)

Next, the second ring 2 according to the first embodiment will be described. As illustrated in FIGS. 2 and 4, the second ring 2 includes a ring upper surface 21, a ring lower surface 22, a ring outer peripheral surface 23, and a ring inner peripheral surface 24. In the used state of the second ring 2, the ring upper surface 21 faces the upper wall W1 of the second ring groove 102, the ring lower surface 22 faces the lower wall W2, and the ring outer peripheral surface 23 slidingly contacts the cylinder inner wall 20a.

As illustrated in FIG. 4, the ring outer peripheral surface 23 includes a second outer peripheral region S21 that is formed outward into a convex shape in the radial direction of the second ring 2, and a pair of connection regions S22, S22 that connects the second outer peripheral region S21 to the ring upper surface 21 and the ring lower surface 22. One of the pair of connection regions S22, S22 connects an upper edge E21 of the second outer peripheral region S21 and an outer edge of the ring upper surface 21. The other of the pair of connection regions S22, S22 connects a lower edge E22 of the second outer peripheral region S21 and an outer edge of the ring lower surface 22. The second outer peripheral region S21 includes a second protruding surface 231 that is, in a cross-section perpendicular to the circumferential direction of the second ring 2, curved outward into a convex shape in the radial direction of the second ring 2. A peak P2 of the convex shape of the second protruding surface 231 is at an outermost position of the ring outer peripheral surface 23 in the radial direction of the second ring 2. More specifically, the second outer peripheral region S21 of the ring outer peripheral surface 23 is, as a whole, formed into a symmetrical barrel-shaped curved surface. That is, the second outer peripheral region S21 has a symmetrical barrel shape that is symmetrical in the axial direction across the peak P2, with the second protruding surface 231 forming an arc that protrudes outward in the radial direction in the cross-section perpendicular to the circumferential direction and the peak P2 of the convex shape being positioned at a center of the ring outer peripheral surface 23 in the axial direction (the vertical direction). An upper end of the arc is connected to the connection region S22 on the upper side, and a lower end of the arc is connected to the connection region S22 on the lower side. The peak P2 is at an outermost position of the ring outer peripheral surface 23 in the radial direction, and the peak P2 slidingly contacts the cylinder inner wall 20a in the used state. A region of the second outer peripheral region S21 including the peak P2 forms the second protruding surface 231. A reference sign "CL2" in FIG. 4 indicates a straight line that is, in the cross-section, perpendicular to a center axis A2 of the second ring 2 and that passes through the center of the ring outer peripheral surface 23 in the axial direction, or in other words, the center of the ring width. The symmetrical barrel-shaped curved surface forming the second outer peripheral region S21 may also be seen as a curved surface that is formed by causing an arc having a predetermined radius r2, a center C2 of which is on the center line CL2 and on the inner side than the ring outer peripheral surface 23 in the radial direction, to revolve around the center axis A2. As illustrated in FIG. 4, the peak P2 is positioned on the center line CL2. The ring outer peripheral surface 23 is an example of "second outer peripheral surface" according to the present invention. Additionally, in the present example, the second outer peripheral region S21 is formed by an arc having a uniform radius, but the second outer peripheral region S21 is not limited to such a shape. The ring outer peripheral surface 23 does not have to have a symmetrical barrel shape so long as it is barrel-shaped. That is, the peak P2 does not have to be positioned at the center of the ring outer peripheral surface 23 in the axial direction (that is, on the center line CL2), and the peak P2 may be offset to the combustion chamber 30 side or the crankcase 40 side. That is, it suffices if the ring outer peripheral surface 23 has the second protruding surface 231 that is curved outward into a convex shape in the radial direction. In the cross-section perpendicular to the circumferential direction, the second protruding surface 231 does not have to have an arc shape with a uniform radius, and may alternatively have a curved shape where a plurality of arcs having different radii are joined continuously in a manner protruding outward in the radial direction. Furthermore, the second outer peripheral region S21 may include a flat region. For example, the second protruding surface 231 may include, at the peak P2, a flat portion that is parallel to the axial direction. Moreover, the second ring 2 does not have to include the pair of connection regions S22, S22, and the second outer peripheral region S21 may be joined continuously to the ring upper surface 21 and the ring lower surface 22. That is, the entire region of the ring outer peripheral surface 23 may be taken as the second outer peripheral region S21.

A reference sign "a21" in FIG. 4 indicates a barrel width of the ring outer peripheral surface 23 on the combustion chamber 30 side, or in other words, a distance in the radial direction between the peak P2 of the ring outer peripheral surface 23 and the upper edge E21 of the second outer peripheral region S21. "a21" is equal to a distance from the cylinder inner wall 20a to the upper edge E21 of the second outer peripheral region S21 in the used state. In the same manner, "a22" is a barrel width of the ring outer peripheral surface 23 on the crankcase 40 side, or in other words, a distance in the radial direction between the peak P2 of the ring outer peripheral surface 23 and the lower edge E22 of the second outer peripheral region S21. "a22" is equal to a distance from the cylinder inner wall 20a to the lower edge E22 of the second outer peripheral region S21 in the used state. In the present example, the second outer peripheral region S21 is formed as a symmetrical barrel-shaped curved surface, and thus, the upper edge E21 and the lower edge E22 of the second outer peripheral region S21 coincide with each other in the radial direction. Accordingly, "a21" and "a22" are equal to each other. However, it is not limited to this. Moreover, a reference sign "b21" in FIG. 4 indicates a distance in the axial direction between the peak P2 of the ring outer peripheral surface 23 and the upper edge E21 of the second outer peripheral region S21. Furthermore, "b22" indicates a distance in the axial direction between the peak P2 of the ring outer peripheral surface 23 and the lower edge E22 of the second outer peripheral region S21. In the present example, the second outer peripheral region S21 is formed as a symmetrical barrel-shaped curved surface, and thus, "b21" and "b22" are equal to each other. However, it is not limited to this.

(Oil Ring)

Next, the oil ring 3 according to the first embodiment will be described. As illustrated in FIGS. 2 and 5, the oil ring 3 includes a pair of ring-shaped segments (also referred to as "side rails") 4, 4 that are vertically arranged (on both sides in the axial direction), and an expander-spacer 5 that is disposed on the inner side than the segments 4, 4 in the radial direction to bias the segments 4, 4 toward the cylinder inner wall 20a. The pair of segments 4, 4 of the oil ring 3 according to the present embodiment has the same shape. In the following, of the pair of segments 4, 4, the segment 4 disposed on the upper side (the combustion chamber 30 side) will be referred to as an upper segment 4U, and the segment 4 disposed on the lower side (the crankcase 40 side) will be referred to as a lower segment 4L, and when not distinguishing between the two, a term "segment(s) 4" will be simply used.

As illustrated in FIG. 5, the segment 4 includes a segment upper surface 41, a segment lower surface 42, a segment outer peripheral surface 43, and a segment inner peripheral surface 44. In the used state of the oil ring 3, the upper segment 4U is disposed such that the segment upper surface 41 faces the upper wall W1 of the oil ring groove 103, the segment lower surface 42 and the segment inner peripheral surface 44 contact the expander-spacer 5, and the segment outer peripheral surface 43 slidingly contacts the cylinder inner wall 20a. In the used state of the oil ring 3, the lower segment 4L is disposed such that the segment lower surface 42 faces the lower wall W2 of the oil ring groove 103, the segment upper surface 41 and the segment inner peripheral surface 44 contacts the expander-spacer 5, and the segment outer peripheral surface 43 slidingly contacts the cylinder inner wall 20a.

Figure 6:
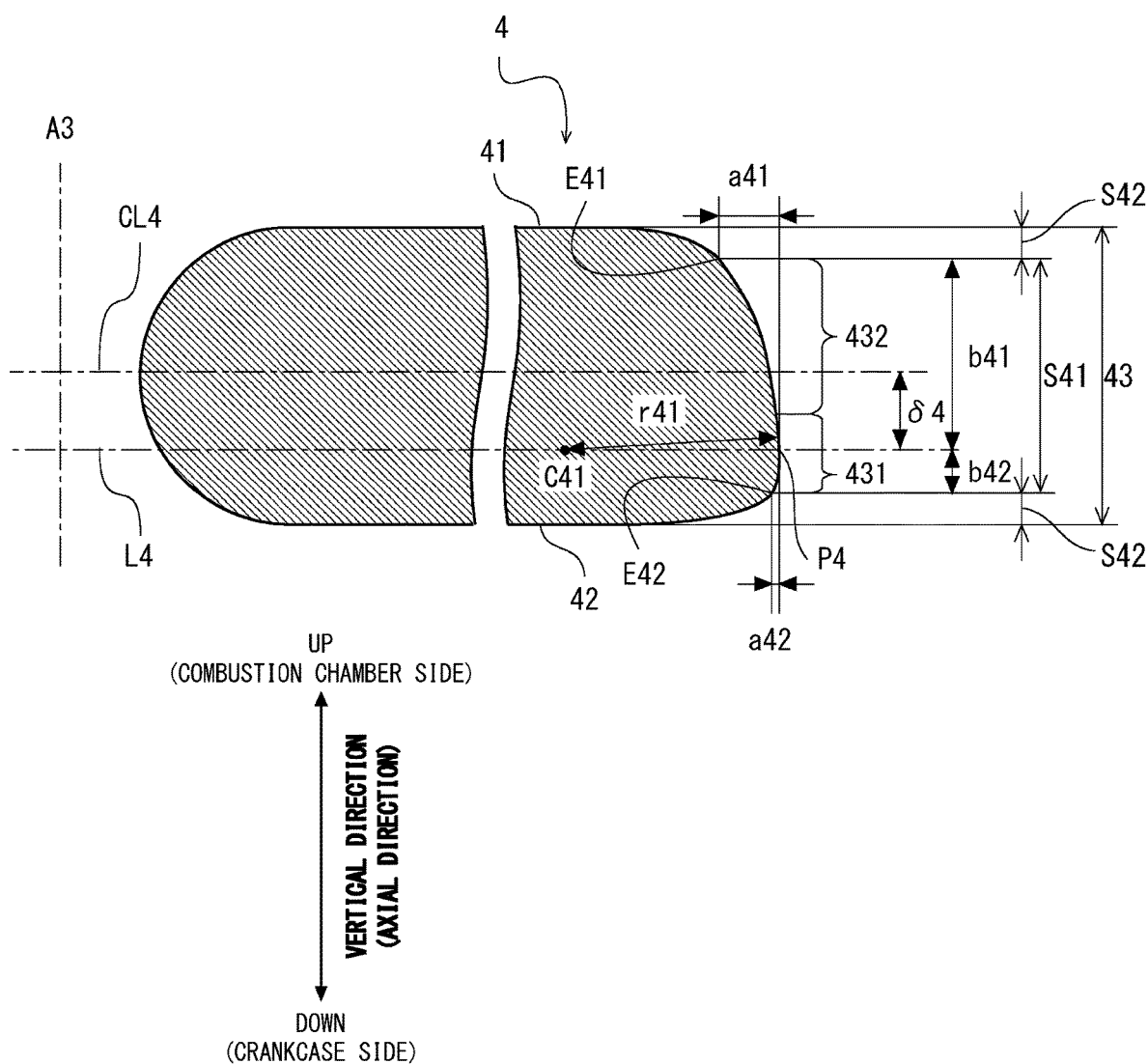
FIG. 6 is a cross-sectional view, perpendicular to a circumferential direction, of a segment provided on the oil ring according to the first embodiment.

FIG. 6 is a cross-sectional view, perpendicular to a circumferential direction, of the segment 4. As illustrated in FIG. 6, the segment outer peripheral surface 43 includes a third outer peripheral region S41 that is formed outward into a convex shape in the radial direction of the oil ring 3, and a pair of connection regions S42, S42 that connects the third outer peripheral region S41 to the segment upper surface 41 and the segment lower surface 42. One of the pair of connection regions S42, S42 connects an upper edge E41 of the third outer peripheral region S41 and an outer edge of the segment upper surface 41. The other of the pair of connection regions S42, S42 connects a lower edge E42 of the third outer peripheral region S41 and an outer edge of the segment lower surface 42. The third outer peripheral region S41 includes a third protruding surface 431 that is, in the cross-section perpendicular to the circumferential direction of the oil ring 3, curved outward into a convex shape in the radial direction of the oil ring 3. A peak P4 of the convex shape of the third protruding surface 431 is at an outermost position of the segment outer peripheral surface 43 in the radial direction of the oil ring 3. Furthermore, with the third outer peripheral region S41, the lower edge E42 is positioned more outward in the radial direction than the upper edge E41, and the peak P4 of the third protruding surface 431 is positioned closer to the crankcase 40 than a center of the segment outer peripheral surface 43 in the axial direction of the oil ring 3, or in other words, a center of a segment width (a dimension of the segment 4 in the axial direction). The peak P4 is at an outermost position of the segment outer peripheral surface 43 in the radial direction, and the peak P4 slidingly contacts the cylinder inner wall 20a in the used state. Moreover, as illustrated in FIG. 6, the third outer peripheral region S41 further includes, between the third protruding surface 431 and the upper edge E41, a curved surface 432 that is curved outward into a convex shape in the radial direction in the cross-section perpendicular to the circumferential direction of the oil ring 3, the curved surface 432 having a diameter that is gradually reduced toward the combustion chamber 30 side. The curved surface 432 connects an upper end of the third protruding surface 431 and the upper edge E41 of the third outer peripheral region S41. The third outer peripheral region S41 is thus formed into an asymmetrical barrel-shaped curved surface. That is, the third outer peripheral region S41 has an eccentric barrel shape that is asymmetrical in the axial direction across the peak P4, with the third protruding surface 431 being curved outward in the convex shape in the radial direction in the cross-section perpendicular to the circumferential direction and the peak P4 of the convex shape being positioned closer to the crankcase 40 than a center of the segment outer peripheral surface 43 in the axial direction (the vertical direction) of the oil ring 3. The segment outer peripheral surface 43 is an example of "third outer peripheral surface" according to the present invention.

A reference sign "δ4" in FIG. 6 indicates an amount of offset of the peak P4 from the center of the segment outer peripheral surface 43 in the axial direction. Furthermore, a reference sign "CL4" in FIG. 6 indicates a straight line that is, in the cross-section, perpendicular to a center axis A3 of the oil ring 3 and that passes through the center of the segment outer peripheral surface 43 in the axial direction (the center of the segment width). Furthermore, a reference sign "L4" indicates a straight line that is perpendicular to the center axis A3 of the oil ring 3 and that is positioned closer to the crankcase 40 than the center line CL4 by the amount of offset δ4. As illustrated in FIG. 6, the third protruding surface 431 forms an arc that protrudes outward in the radial direction in the cross-section perpendicular to the circumferential direction. A lower end of the arc is connected to the connection region S42 on the lower side. The third protruding surface 431 may also be seen as a curved surface that is formed by causing an arc having a predetermined radius r41, a center C41 of which is on the inner side than the segment outer peripheral surface 43 in the radial direction, to revolve around the center axis A3. Additionally, in FIG. 6, the center C41 is positioned on the straight line L4, but the position of the center C41 is not limited thereto. Furthermore, in the cross-section perpendicular to the circumferential direction, the third protruding surface 431 does not have to have an arc shape with a uniform radius, and may alternatively have a curved shape where a plurality of arcs having different radii are joined continuously in a manner protruding outward in the radial direction. Moreover, the third outer peripheral region S41 may include a flat region. For example, the third protruding surface 431 may include, at the peak P4, a flat portion that is parallel to the axial direction. Moreover, the segment 4 does not have to include the pair of connection regions S42, S42, and the third outer peripheral region S41 may be joined continuously to the segment upper surface 41 and the segment lower surface 42. That is, the entire region of the segment outer peripheral surface 43 may be taken as the third outer peripheral region S41.

A reference sign "a41" in FIG. 6 is a barrel width of the segment outer peripheral surface 43 on the combustion chamber 30 side, or in other words, a distance in the radial direction between the peak P4 of the segment outer peripheral surface 43 and the upper edge E41 of the third outer peripheral region S41, and is equal to a distance from the cylinder inner wall 20a to the upper edge E41 of the third outer peripheral region S41 in the used state. In the same manner, "a42" is a barrel width of the segment outer peripheral surface 43 on the crankcase 40 side, or in other words, a distance in the radial direction between the peak P4 of the segment outer peripheral surface 43 and the lower edge E42 of the third outer peripheral region S41, and is equal to a distance from the cylinder inner wall 20a to the lower edge E42 of the third outer peripheral region S41 in the used state. As illustrated in FIG. 6, with the third outer peripheral region S41, the lower edge E42 is positioned more outward in the radial direction than the upper edge E41, and thus, "a42" is smaller than "a41". Furthermore, a reference sign "b41" in FIG. 6 indicates a distance in the axial direction between the peak P4 of the segment outer peripheral surface 43 and the upper edge E41 of the third outer peripheral region S41. Furthermore, "b42" indicates a distance in the axial direction between the peak P4 of the segment outer peripheral surface 43 and the lower edge E42 of the third outer peripheral region S41. As illustrated in FIG. 6, with the segment outer peripheral surface 43, the peak P4 of the third protruding surface 431 is positioned more closer to the crankcase 40 than the center of the segment outer peripheral surface 43 in the axial direction, and thus, "b42" is smaller than "b41".

Conventional Example

Figure 7:
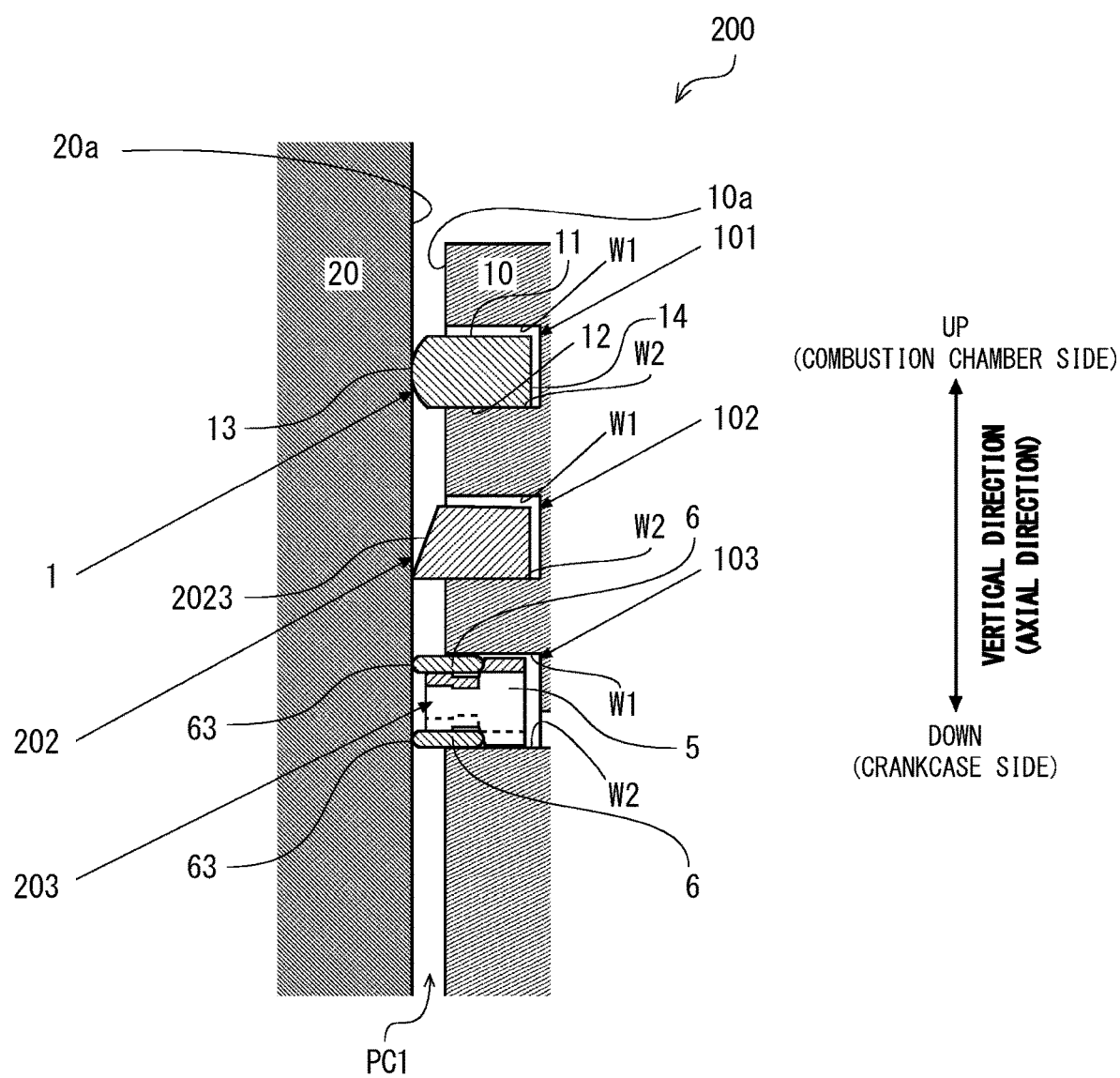
FIG. 7 is an enlarged view of and around ring grooves of an internal combustion engine provided with a piston ring combination according to a conventional example.

FIG. 7 is a view of and around ring grooves of an internal combustion engine 200 provided with a piston ring combination according to a conventional example. The internal combustion engine 200 according to the conventional example is different from the internal combustion engine 100 in that the internal combustion engine 200 uses a second ring 202 instead of the second ring 2, and an oil ring 203 instead of the oil ring 3. The second ring 202 has a tapered shape where a ring outer peripheral surface 2023 that slidingly contacts the cylinder inner wall 20a is gradually reduced in terms of diameter toward the combustion chamber 30 side. The oil ring 203 is structured to bias a pair of segments 6, 6 that are vertically arranged (on both sides in the axial direction) toward the cylinder inner wall 20a by the expander-spacer 5. Unlike the pair of segments 4, 4, the pair of segments 6, 6 each includes a segment outer peripheral surface 63 that is symmetrically barrel-shaped.

Operations/Effects

Next, operations and effects of the piston ring combination according to the embodiment will be described in comparison with the conventional example. In contrast to the conventional example, with the internal combustion engine 100, the ring outer peripheral surface 23 of the second ring 2 that slidingly contacts the cylinder inner wall 20a has a shape that is, in the cross-section perpendicular to the circumferential direction, curved outward into a convex shape in the radial direction. That is, the second ring 2 slidingly contacts the cylinder inner wall 20a through the second protruding surface 231 that is curved outward into a convex shape in the radial direction. That is, the second ring 2 slidingly contacts the cylinder inner wall 20a through a barrel-shaped outer peripheral surface having a curvature. As a result, friction that is generated against the cylinder inner wall 20a may be reduced compared with the second ring 202 according to the conventional example having a tapered outer peripheral surface.

When comparing the second ring 2 according to the first embodiment and the second ring 202 according to the conventional example in relation to the oil seal performance, the oil seal performance tends to be reduced for the second ring 2 that slidingly contacts the cylinder inner wall 20a through a barrel-shaped outer peripheral surface than for the second ring 202 having a tapered shape, but with the piston ring combination according to the first embodiment, the segment outer peripheral surfaces 43 of the pair of segments 4, 4 provided on the oil ring 3 are eccentrically barrel-shaped as described above. That is, the pair of segment outer peripheral surfaces 43 each include the third protruding surface 431 that is curved outward into a convex shape in the radial direction in the cross-section perpendicular to the circumferential direction of the oil ring 3, where the peak P4 of the convex shape is at an outermost position of the segment outer peripheral surface 43 in the radial direction of the oil ring 3, and the lower edge E42 of the third outer peripheral region S41 is positioned more outward in the radial direction than the upper edge E41, and the peak P4 of the third protruding surface 431 is positioned closer to the crankcase 40 than the center of the segment outer peripheral surface 43 in the axial direction. Accordingly, with the segments 4, 4, the barrel width a42 on the crankcase 40 side is smaller than the barrel width a41 on the combustion chamber 30 side, and the distance b42 between the peak P4 of the third outer peripheral region S41 and the lower edge E42 of the third outer peripheral region S41 in the axial direction is smaller than the distance b41 between the peak P4 and the upper edge E41 of the third outer peripheral region S41 in the axial direction. Accordingly, in the used state, the gap between the cylinder inner wall 20a and the third outer peripheral region S41 may be made smaller on the crankcase 40 side than on the combustion chamber 30 side with the peak P4 as the boundary. Therefore, oil may be appropriately scraped off at the time of lowering of the piston 10, and at the time of rising of the piston 10, the segment outer peripheral surface 43 runs on the oil due to the wedge effect, and thus, oil may be prevented from being scraped upward. Accordingly, oil in the piston clearance PC1 is prevented from easily flowing from the crankcase 40 side to the combustion chamber 30 side through the gap on the crankcase 40 side, and oil rise may be better prevented. As a result, the oil ring 3 may achieve increased oil seal performance than the oil ring 203 according to the conventional example where the segment outer peripheral surfaces 63 of the pair of segments 6, 6 are symmetrical barrel-shaped. For example, in the case of the segment 4 having a thickness (a dimension in the radial direction) of 1.7 mm and a width (a dimension in the axial direction) of 0.4 mm, the radius r41, the amount of offset δ4, the barrel widths a41, a42, and the distances b41, b42 from the peak P4 to the upper and lower edges in the axial direction are particularly desirably r41=approximately 0.5 mm, δ4=0.08 mm, a41=0.06 mm, a42=0.004 mm, b41=0.23 mm, and b42=0.06 mm, from the standpoint of increasing the oil seal performance. However, the present invention is not limited to the dimensions mentioned above.

As described above, the piston ring combination provided in the internal combustion engine 100 according to the present embodiment reduces friction due to the second ring by making the ring outer peripheral surface 23 of the second ring 2 a barrel shape, and increases the oil seal performance of the oil ring by making each segment outer peripheral surface 43 of the pair of segments 4, 4 provided on the oil ring 3 an eccentric barrel shape. Such a piston ring combination may reduce friction loss while securing the oil seal performance.

Now, with the piston ring combination according to the present embodiment, all the outer peripheral surfaces of the top ring 1, the second ring 2, and the oil ring 3 are barrel-shaped. Accordingly, the top ring 1 slidingly contacts the cylinder inner wall 20a through the first protruding surface 131 that is curved outward into a convex shape in the radial direction, the second ring 2 slidingly contacts the cylinder inner wall 20a through the second protruding surface 231 that is curved outward into a convex shape in the radial direction, and the oil ring 3 slidingly contacts the cylinder inner wall 20a through the third protruding surface 431 that is curved outward into a convex shape in the radial direction. That is, with the piston ring combination according to the present embodiment, all the piston rings slidingly contact the cylinder inner wall 20a through the barrel-shaped outer peripheral surfaces having curvatures. As a result, aggressiveness of the piston rings toward the cylinder inner wall 20a during an initial stage of operation of the internal combustion engine 100 may be reduced, and the cylinder inner wall 20a may be prevented from being scratched.

Furthermore, the third outer peripheral region S41 according to the present embodiment includes, between the third protruding surface 431 and the upper edge, the curved surface 432 that is curved outward into a convex shape in the radial direction in the cross-section perpendicular to the circumferential direction of the oil ring 3, the curved surface 432 having a diameter that is gradually reduced toward the combustion chamber 30 side. This increases the wedge effect at the time of rising of the piston 10, and upward scraping of oil may be further suppressed.

Additionally, in the present invention, the third outer peripheral regions S41 of both of the segment outer peripheral surfaces 43 of the pair of segments 4, 4 may be formed into an eccentric barrel shape while making the radius r4, the amount of offset δ4, the barrel widths a41, a42, and the distances b41, b42 from the peak P4 to the upper edge E41 and the lower edge E42 in the axial direction different between the upper segment 4U and the lower segment 4L. Moreover, in the present invention, it suffices if the third outer peripheral region S41 of the segment outer peripheral surface 43 of at least one of the pair of segments 4, 4 is eccentrically barrel-shaped described above, and the segment outer peripheral surface 43 of the upper segment 4U may be made an eccentric barrel shape and the segment outer peripheral surface 43 of the lower segment 4L may be made a symmetrical barrel shape having the peak P4 at a center position in the axial direction, for example. However, in the present embodiment, oil consumption of the internal combustion engine 100 may be more reduced in a case where the segment outer peripheral surfaces 43 of the pair of segments 4, 4 are both made an eccentric barrel shape to thereby increase the oil seal performance thereof, than in a case where only one of the segment outer peripheral surfaces 43 is made an eccentric barrel shape. Moreover, the ring outer peripheral surface 13 of the top ring 1 is not limited to be symmetrically barrel-shaped. That is, the ring outer peripheral surface 13 may be eccentrically barrel-shaped.

Example

An internal combustion engine according to an example corresponds to the internal combustion engine 100 provided with the piston ring combination according to the first embodiment. That is, with a piston ring combination of the example, an outer peripheral surface of a top ring is symmetrically barrel-shaped, an outer peripheral surface of a second ring is symmetrically barrel-shaped, and outer peripheral surfaces of a pair of segments provided on an oil ring are eccentrically barrel-shaped.

Comparative Example

An internal combustion engine according to a comparative example corresponds to the internal combustion engine 200 provided with the piston ring combination according to the conventional example. That is, with a piston ring combination according to the comparative example, an outer peripheral surface of a top ring is symmetrically barrel-shaped, an outer peripheral surface of a second ring is tapered, and outer peripheral surfaces of a pair of segments provided on an oil ring are symmetrically barrel-shaped.
(Experiment)

In an experiment, the internal combustion engine according to the example and the internal combustion engine according to the comparative example were each operated at engine speeds of 620 rpm, 1035 rpm, and 1555 rpm, and friction mean effective pressures (FMEPs) were measured.
(Experiment Result)

Figure 8:
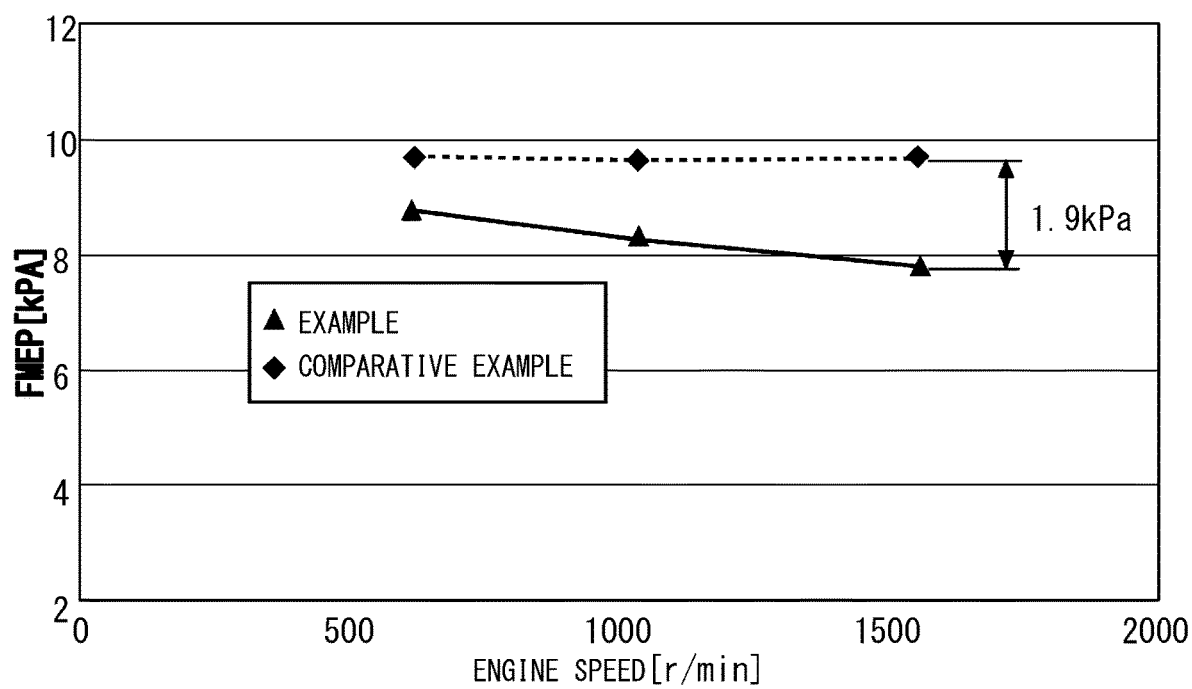
FIG. 8 is a graph illustrating FMEP in relation to engine speed according to an experiment example and a comparative example.

FIG. 8 is a graph illustrating a relationship between the engine speed and the FMEP for the example and the comparative example. As can be seen in FIG. 8, the FMEP is lower for the internal combustion engine according to the example than for the internal combustion engine according to the comparative example at each of the engine speeds of 620 rpm, 1035 rpm, and 1555 rpm. It can thus be seen that the piston ring combination according to the embodiment is effective in reducing friction. Particularly, at 1555 rpm in a high engine speed range, the difference in the FMEPs is 1.9 kPa between the example and the comparative example, and it can be confirmed that the friction reduction effect is significant in the high engine speed range.

First Modification of First Embodiment

Figure 9:
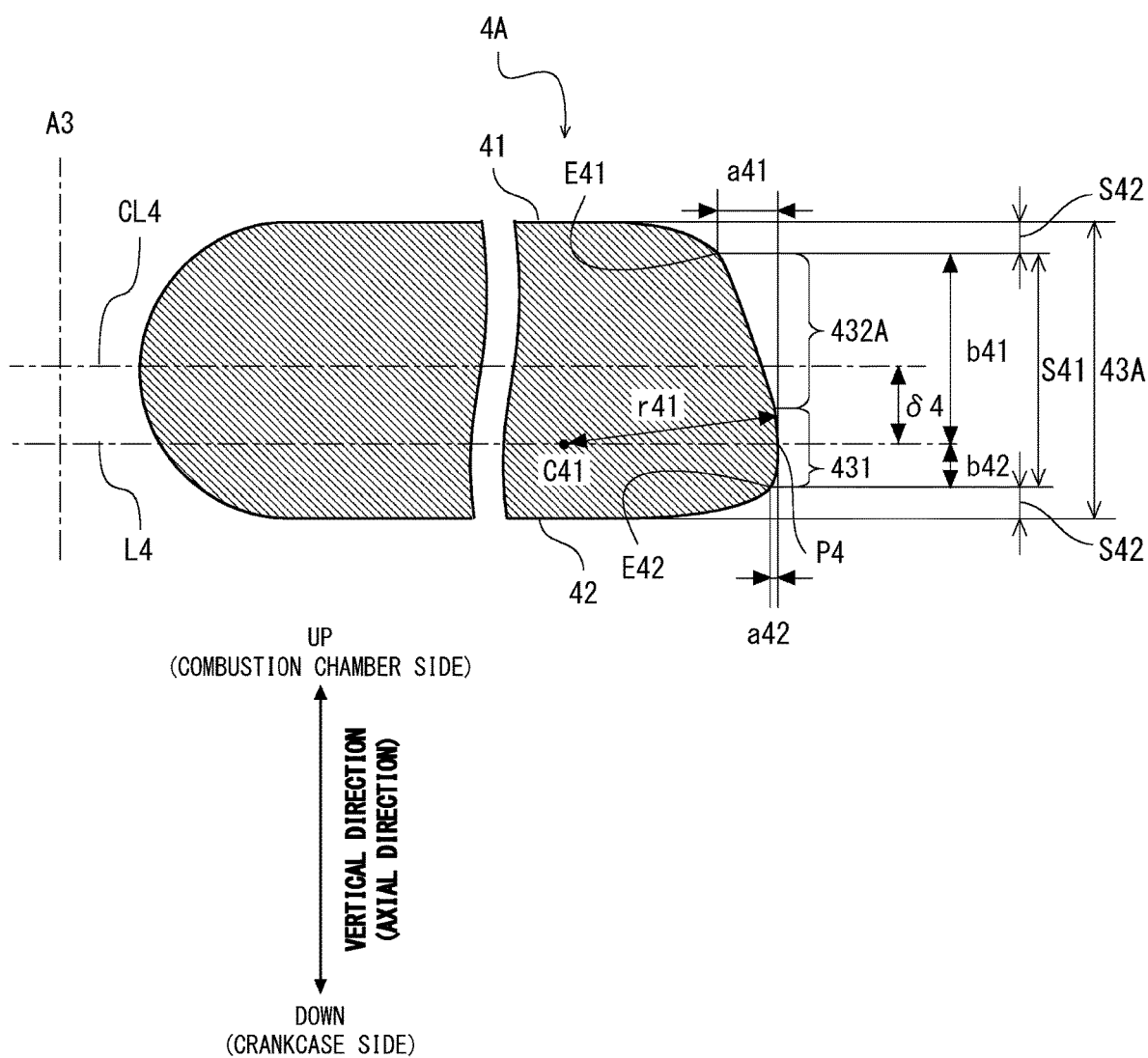
FIG. 9 is a cross-sectional view, perpendicular to a circumferential direction, of a segment according to a first modification of the first embodiment.

FIG. 9 is a cross-sectional view illustrating a cross-section, perpendicular to a circumferential direction, of a segment 4A according to a first modification of the first embodiment. As illustrated in FIG. 9, the segment 4A is different from the segment 4 in that a segment outer peripheral surface 43A has a tapered barrel shape. More specifically, with the segment outer peripheral surface 43A of the segment 4A, the third outer peripheral region S41 includes, between the third protruding surface 431 and the upper edge of the third outer peripheral region S41, a tapered surface 432A that is curved outward into a convex shape in the radial direction in the cross-section perpendicular to the circumferential direction of the oil ring 3, the tapered surface 432A having a diameter that is gradually reduced toward the combustion chamber 30 side. Also with the segment 4A, the third protruding surface 431 may have a curved shape, in the cross-section perpendicular to the circumferential direction, where a plurality of arcs having different radii are joined continuously in a manner protruding outward in the radial direction, instead of an arc shape with a uniform radius. Furthermore, the third outer peripheral region S41 may include a flat region. For example, the third protruding surface 431 may include, at the peak P4, a flat portion that is parallel to the axial direction.

Second Modification of First Embodiment

Figure 10A:
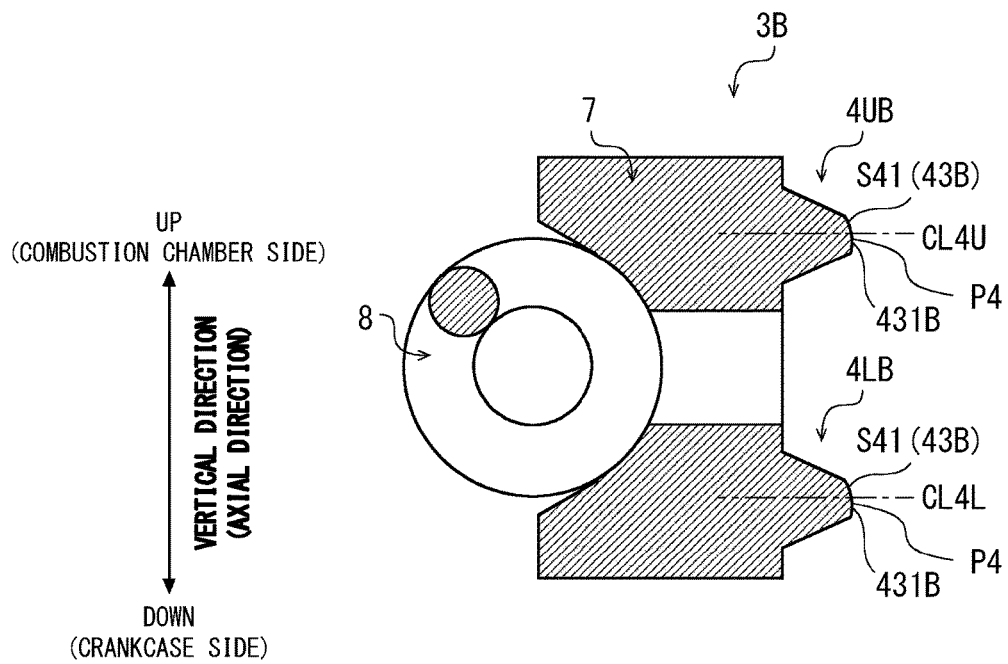
FIG. 10A is a cross-sectional view, perpendicular to a circumferential direction, of an oil ring according to a second modification of the first embodiment.
Figure 10B:
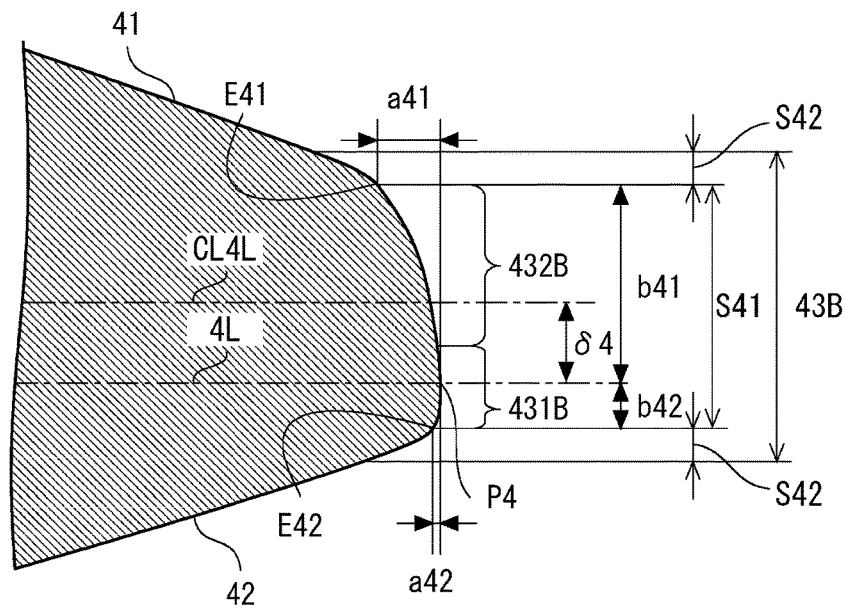
FIG. 10B is an enlarged view of a rail outer peripheral surface 43B illustrated in FIG. 10A.

FIG. 10A is a cross-sectional view, perpendicular to a circumferential direction, of an oil ring 3B according to a second modification of the first embodiment. FIG. 10B is an enlarged view of a rail outer peripheral surface 43B illustrated in FIG. 10A. The oil ring according to the present invention may be a so-called two-piece oil ring, as illustrated in FIG. 10A, including an oil ring main body 7 integrating a pair of rails 4UB, 4LB, and a coil expander 8 that biases the oil ring main body 7 toward the inner wall of the cylinder. The pair of rails 4UB, 4LB are provided on respect sides of the oil ring main body 7 in the axial direction. The pair of rails 4UB, 4LB are parts corresponding to the pair of segments 4U, 4L of the oil ring 3.

A reference sign "CL4U" in FIG. 10A indicates a straight line that is perpendicular to an axial direction of the rail 4UB and that passes through a center of the rail outer peripheral surface 43B of the rail 4UB in the axial direction, and a reference sign "CL4L" indicates a straight line that is perpendicular to an axial direction of the rail 4LB and that passes through a center of the rail outer peripheral surface 43B of the rail 4LB in the axial direction. The rail outer peripheral surfaces 43B of the pair of rails 4UB, 4LB are eccentrically barrel-shaped, like the segment outer peripheral surfaces 43 of the pair of segments 4U, 4L. More specifically, as illustrated in FIG. 10B, the rail outer peripheral surfaces 43B of the pair of rails 4UB, 4LB each include a third protruding surface 431B that is curved outward into a convex shape in the radial direction in a cross-section perpendicular to the circumferential direction of the oil ring 3B, where the peak P4 of the convex shape is at an outermost position of the rail outer peripheral surface 43B in the radial direction, and the lower edge E42 of the third outer peripheral region S41 is positioned more outward in the radial direction than the upper edge E41, and the peak P4 of the third protruding surface 431B is positioned closer to the crankcase 40 than the center of the rail outer peripheral surface 43B in the axial direction. The oil seal performance of the oil ring is thereby increased. The rail outer peripheral surface 43B is an example of "third outer peripheral surface" according to the present invention. Alternatively, with the oil ring 3B, only one of the rail outer peripheral surfaces 43B of the pair of rails 4UB, 4LB may be eccentrically barrel-shaped. For example, the rail outer peripheral surface 43B of the rail 4UB may be eccentrically barrel-shaped, and the rail outer peripheral surface 43B of the rail 4LB may be symmetrically barrel-shaped, and vice versa.

Third Modification of First Embodiment

Figure 11:
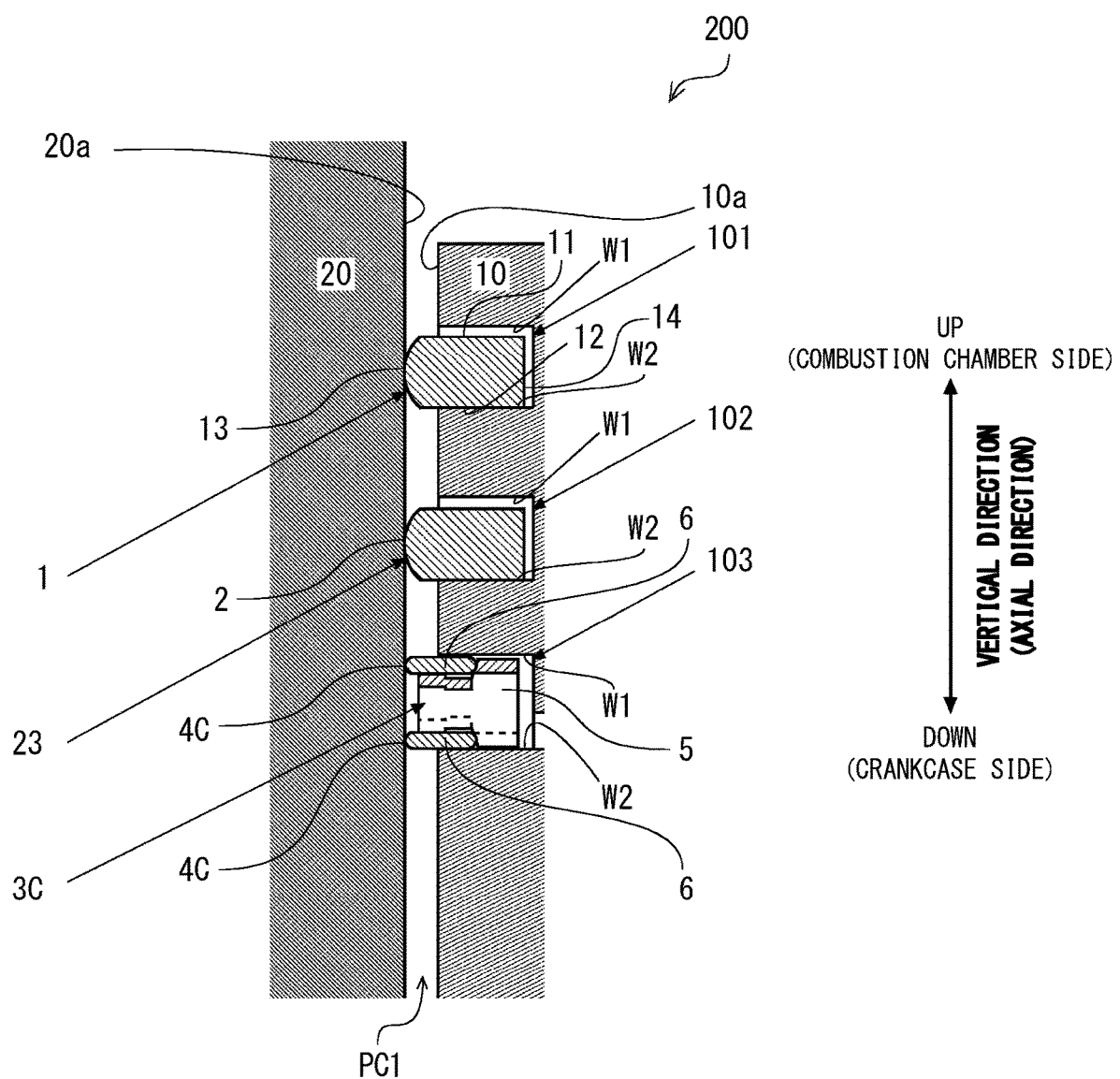
FIG. 11 is an enlarged view of and around ring grooves of an internal combustion engine provided with a piston ring combination according to a third modification of the first embodiment.

FIG. 11 is an enlarged view of and around ring grooves of an internal combustion engine provided with a piston ring combination according to a third modification of the first embodiment. The piston ring combination according to the third modification is different from the piston ring combination illustrated in FIG. 2 in that segment outer peripheral surfaces 43C of both of a pair of segments 4C, 4C of an oil ring 3C are symmetrically barrel-shaped. Moreover, the piston ring combination according to the third modification may be understood to be the piston ring combination of the conventional example illustrated in FIG. 7 albeit with the shape of the outer peripheral surface of the second ring changed to a symmetrical barrel shape. All the outer peripheral surfaces of the top ring 1, the second ring 2, and the oil ring 3C of the piston ring combination according to the third modification are thus symmetrically barrel-shaped. Accordingly, with the piston ring combination according to the third modification, friction loss may be reduced, although the oil seal performance is reduced compared with the piston ring combination illustrated in FIG. 2. Such a piston ring combination may be used in an internal combustion engine with relatively small oil consumption, such as an internal combustion engine with a low normal engine speed. Additionally, the second ring 2 and the segments 4C, 4C of the oil ring 3C may each include a flat portion on the outer peripheral surface.

Second Embodiment

Figure 12:
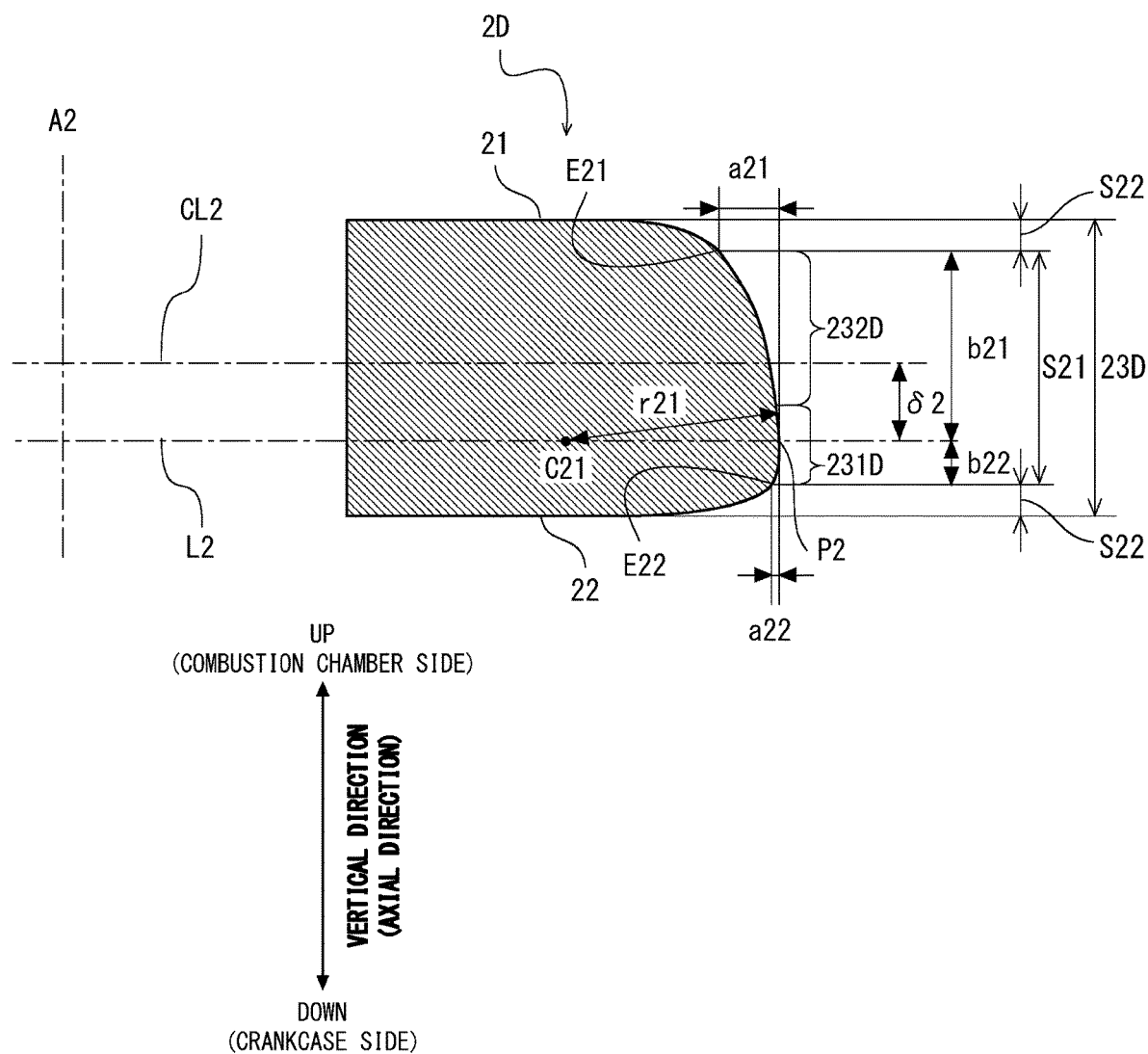
FIG. 12 is a cross-sectional view, perpendicular to a circumferential direction, of a second ring according to a second embodiment.

FIG. 12 is a cross-sectional view, perpendicular to a circumferential direction, of a second ring 2D that is used in a piston ring combination according to a second embodiment. The piston ring combination according to the second embodiment is the same as the piston ring combination according to the first embodiment, excepting that the second ring 2D including a ring outer peripheral surface 23D that is eccentrically barrel-shaped is used instead of the second ring 2 including the ring outer peripheral surface 23 that is symmetrically barrel-shaped.

As illustrated in FIG. 12, the second outer peripheral region S21 of the ring outer peripheral surface 23D includes a second protruding surface 231D that is, in a cross-section perpendicular to the circumferential direction of the second ring 2D, curved outward into a convex shape in the radial direction. The peak P2 of the convex shape of the second protruding surface 231D is at an outermost position of the ring outer peripheral surface 23D in the radial direction of the second ring 2D. Furthermore, with the ring outer peripheral surface 23D, the lower edge E22 of the second outer peripheral region S21 is positioned more outward in the radial direction than the upper edge E21, and the peak P2 of the second protruding surface 231D is positioned closer to the crankcase 40 than a center of the ring outer peripheral surface 23D in an axial direction of the second ring 2D (that is, a center of a ring width). The peak P2 is at an outermost position of the ring outer peripheral surface 23D in the radial direction, and in the used state, the peak P2 slidingly contacts the cylinder inner wall 20a. Moreover, as illustrated in FIG. 12, the ring outer peripheral surface 23D further includes, between the second protruding surface 231D and the upper edge E21 of the second outer peripheral region S21, a curved surface 232D that is curved outward into a convex shape in the radial direction in the cross-section perpendicular to the circumferential direction of the second ring 2D, the curved surface 232D having a diameter that is gradually reduced toward the combustion chamber 30 side. The curved surface 232D connects an upper end of the second protruding surface 231D and the upper edge E21 of the second outer peripheral region S21. The ring outer peripheral surface 23D is thus formed into an asymmetrical barrel-shaped curved surface.

A reference sign "L2" in FIG. 12 indicates a straight line that is perpendicular to a center axis A2 of the second ring 2D and that is positioned closer to the crankcase 40 than the center line CL2 by an amount of offset δ2. As illustrated in FIG. 12, the straight line L2 passes through the peak P2. The second protruding surface 231D may also be seen as a curved surface that is formed by causing an arc having a predetermined radius r21, a center C21 of which is on the inner side than the ring outer peripheral surface 23D in the radial direction, to revolve around the center axis A2. Additionally, in FIG. 12, the center C21 is positioned on the straight line L2, but the position of the center C21 is not limited thereto. Furthermore, in the cross-section perpendicular to the circumferential direction, the second protruding surface 231D does not have to have an arc shape with a uniform radius, and may alternatively have a curved shape where a plurality of arcs having different radii are joined continuously in a manner protruding outward in the radial direction. Moreover, the second outer peripheral region S21 may include a flat region. For example, the second protruding surface 231D may include, at the peak P2, a flat portion that is parallel to the axial direction.

Accordingly, with the second ring 2D, the barrel width a22 on the crankcase 40 side is smaller than the barrel width a21 on the combustion chamber 30 side, and the distance b22 in the axial direction between the peak P2 of the second outer peripheral region S21 and the lower edge E22 of the second outer peripheral region S21 is smaller than the distance b21 in the axial direction between the peak P2 and the upper edge E21 of the second outer peripheral region S21. Accordingly, in the used state, the gap between the cylinder inner wall 20a and the second outer peripheral region S21 may be made smaller on the crankcase 40 side than on the combustion chamber 30 side with the peak P2 as the boundary. As a result, oil in the piston clearance PC1 is prevented from easily flowing from the crankcase 40 side to the combustion chamber 30 side through the gap between the cylinder inner wall 20a and the ring outer peripheral surface 23D, and oil rise may be better prevented. The second ring 2D may thus achieve increased oil seal performance than the second ring 2 according to the first embodiment.

As described above, the piston ring combination according to the second embodiment may increase the oil seal performance of the second ring by making the outer peripheral surface of the second ring an eccentric barrel shape. As a result, oil consumption of the internal combustion engine may be further reduced compared with the piston ring combination according to the first embodiment. Additionally, in relation to the ring outer peripheral surface 23D, the radius r21, the amount of offset δ2, the barrel widths a21, a22, and the distances b21, b22 from the peal P2 to the upper and lower edges in the axial direction are particularly desirably r21=approximately 1.6 mm, δ2=0.2 mm, a21=0.16 mm, a22=0.03 mm, b21=0.7 mm, and b22=0.3 mm, from the standpoint of increasing the oil seal performance. However, the present invention is not limited to the dimensions mentioned above.

First Modification of Second Embodiment

Figure 13:
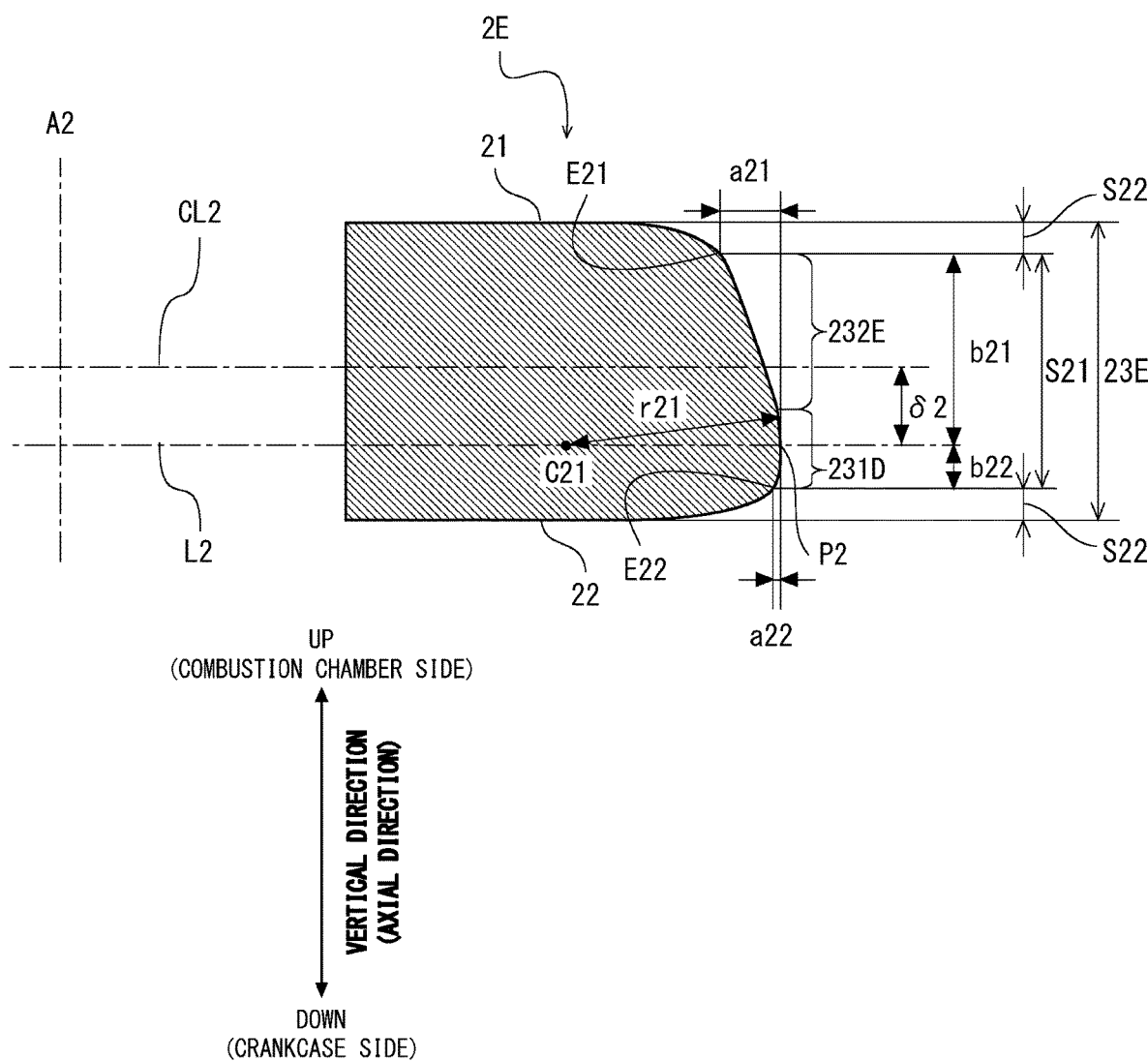
FIG. 13 is a cross-sectional view, perpendicular to a circumferential direction, of a second ring according to a first modification of the second embodiment.

FIG. 13 is a cross-sectional view illustrating a cross-section, perpendicular to a circumferential direction, of a second ring 2E according to a first modification of the second embodiment. As illustrated in FIG. 12, the second ring 2E is different from the second ring 2D in that the second outer peripheral region S21 of a ring outer peripheral surface 23E has a tapered barrel shape. More specifically, the ring outer peripheral surface 23E of the second ring 2E includes, in the second outer peripheral region S21, between the second protruding surface 231D and the upper edge E21 of the second outer peripheral region S21, a tapered surface 232E that is, in a cross-section perpendicular to the circumferential direction of the second ring 2E, curved outward into a convex shape in the radial direction, the tapered surface 232E having a diameter that is gradually reduced toward the combustion chamber 30 side.

Heretofore, preferred embodiments of the present invention have been described, and the various modes described above may be combined in any possible way.

REFERENCE SIGNS LIST

100: internal combustion engine
10: piston
20: cylinder
30: combustion chamber
40: crankcase
1: top ring
11: ring upper surface
12: ring lower surface
13: ring outer peripheral surface
14: ring inner peripheral surface
2: second ring
21: ring upper surface
22: ring lower surface
23: ring outer peripheral surface
24: ring inner peripheral surface
3: oil ring
4: segment
4U: upper segment
4L: lower segment
41: segment upper surface
42: segment lower surface
43: segment outer peripheral surface
44: segment inner peripheral surface
5: expander-spacer

The invention claimed is:

1. A piston ring combination including a top ring, a second ring, and an oil ring that are mounted in ring grooves formed on a piston of an internal combustion engine to prevent an inner wall of a cylinder from being scratched during an initial stage of operation of the internal combustion engine, wherein
a first outer peripheral surface that is an outer peripheral surface of the top ring includes a first outer peripheral region where a first protruding surface is formed, the first protruding surface being curved outward into a convex shape in a radial direction of the top ring in a cross-section perpendicular to a circumferential direction of the top ring, the convex shape having a peak at an outermost position of the first outer peripheral surface in the radial direction of the top ring,
a second outer peripheral surface that is an outer peripheral surface of the second ring includes a second outer peripheral region where a second protruding surface is formed, the second protruding surface being curved outward into a convex shape in a radial direction of the second ring in a cross-section perpendicular to a circumferential direction of the second ring, the convex shape having a peak at an outermost position of the second outer peripheral surface in the radial direction of the second ring, wherein the peak slidingly contacts the inner wall of the cylinder during the initial stage of operation and in a used state,
the oil ring includes a pair of segments, each provided on a corresponding side in an axial direction, and an expander-spacer that biases the pair of segments outward in a radial direction,
a pair of third outer peripheral surfaces that are outer peripheral surfaces of the pair of segments each include a third outer peripheral region where a third protruding surface is formed, the third protruding surface being curved outward into a convex shape in the radial direction of the oil ring in a cross-section perpendicular to a circumferential direction of the oil ring, the convex shape having a peak at an outermost position of the third outer peripheral surface in the radial direction of the oil ring,
in relation to at least one of the pair of third outer peripheral surfaces, a peripheral edge of the third outer peripheral region on a crankcase side is positioned more outward in the radial direction than a peripheral edge on a combustion chamber side, and the peak of the third protruding surface is positioned closer to a crankcase than a center of the third outer peripheral surface in the axial direction of the oil ring, and
the second outer peripheral surface includes a pair of connection regions that connect the second outer peripheral region to a ring upper surface and a ring lower surface, one of the pair of connection regions connecting an upper edge of the second outer peripheral region and an outer edge of the ring upper surface, and the other of the pair of connection regions connecting a lower edge of the second outer peripheral region and an outer edge of the ring lower surface.

2. A piston ring combination including a top ring, a second ring, and an oil ring that are mounted in ring grooves formed on a piston of an internal combustion engine to prevent an inner wall of a cylinder from being scratched during an initial stage of operation of the internal combustion engine, wherein
a first outer peripheral surface that is an outer peripheral surface of the top ring includes a first outer peripheral region where a first protruding surface is formed, the first protruding surface being curved outward into a convex shape in a radial direction of the top ring in a cross-section perpendicular to a circumferential direction of the top ring, the convex shape having a peak at an outermost position of the first outer peripheral surface in the radial direction of the top ring,
a second outer peripheral surface that is an outer peripheral surface of the second ring includes a second outer peripheral region where a second protruding surface is formed, the second protruding surface being curved outward into a convex shape in a radial direction of the second ring in a cross-section perpendicular to a circumferential direction of the second ring, the convex shape having a peak at an outermost position of the second outer peripheral surface in the radial direction of the second ring, wherein the peak slidingly contacts the inner wall of the cylinder during the initial stage of operation and in a used state,
the oil ring includes a ring main body including a pair of rails, each on a corresponding side in an axial direction, and a coil expander that biases the ring main body outward in a radial direction,
a pair of third outer peripheral surfaces that are outer peripheral surfaces of the pair of rails each include a third outer peripheral region where a third protruding surface is formed, the third protruding surface being curved outward into a convex shape in the radial direction of the oil ring in a cross-section perpendicular to a circumferential direction of the oil ring, the convex shape having a peak at an outermost position of the third outer peripheral surface in the radial direction of the oil ring, in relation to at least one of the pair of third outer peripheral surfaces, a peripheral edge of the third outer peripheral region on a crankcase side is positioned more outward in the radial direction than a peripheral edge on a combustion chamber side, and the peak of the third protruding surface is positioned closer to a crankcase than a center of the third outer peripheral surface in the axial direction of the oil ring, and the second outer peripheral surface includes a pair of connection regions that connect the second outer peripheral region to a ring upper surface and a ring lower surface, one of the pair of connection regions connecting an upper edge of the second outer peripheral region and an outer edge of the ring upper surface, and the other of the pair of connection regions connecting a lower edge of the second outer peripheral region and an outer edge of the ring lower surface.

3. The piston ring combination according to claim 1, wherein, in relation to both of the pair of third outer peripheral surfaces, the peripheral edge of the third outer peripheral region on the crankcase side is positioned more outward in the radial direction than the peripheral edge on the combustion chamber side, and the peak of the third protruding surface is positioned closer to the crankcase than the center of the third outer peripheral surface in the axial direction of the oil ring.

4. The piston ring combination according to claim 1, wherein the third outer peripheral region includes, between the third protruding surface and the peripheral edge on the combustion chamber side, a curved surface that is, in the cross-section perpendicular to the circumferential direction of the oil ring, curved outward into a convex shape in the radial direction of the oil ring, the curved surface having a diameter that is gradually reduced toward the combustion chamber side.

5. The piston ring combination according to claim 1, wherein the third outer peripheral region includes, between the third protruding surface and the peripheral edge on the combustion chamber side, a tapered surface that has a diameter that is gradually reduced toward the combustion chamber side.

6. The piston ring combination according to claim 1, wherein, of the second outer peripheral surface, a peripheral edge of the second outer peripheral region on the crankcase side is positioned more outward in the radial direction than a peripheral edge on the combustion chamber side, and the peak of the second protruding surface is positioned closer to the crankcase than a center of the second outer peripheral surface in an axial direction of the second ring.

7. The piston ring combination according to claim 6, wherein the second outer peripheral region includes, between the second protruding surface and the peripheral edge on the combustion chamber side, a curved surface that is, in the cross-section perpendicular to the circumferential direction of the second ring, curved outward into a convex shape in the radial direction of the second ring, the curved surface having a diameter that is gradually reduced toward the combustion chamber side.

8. The piston ring combination according to claim 6, wherein the second outer peripheral region includes, between the second protruding surface and the peripheral edge on the combustion chamber side, a tapered surface that has a diameter that is gradually reduced toward the combustion chamber side.

9. The piston ring combination according to claim 1, wherein, of the first outer peripheral surface, a peripheral edge of the first outer peripheral region on the crankcase side is positioned more outward in the radial direction than a peripheral edge on the combustion chamber side, and the peak of the first protruding surface is positioned closer to the crankcase than a center of the first outer peripheral surface in an axial direction of the top ring.

10. The piston ring combination according to claim 9, wherein the first outer peripheral region includes, between the first protruding surface and the peripheral edge on the combustion chamber side, a curved surface that is, in the cross-section perpendicular to the circumferential direction of the top ring, curved outward into a convex shape in the radial direction of the top ring, the curved surface having a diameter that is gradually reduced toward the combustion chamber side.

11. The piston ring combination according to claim 6, wherein, of the first outer peripheral surface, a peripheral edge on the crankcase side and a peripheral edge on the combustion chamber side of the first outer peripheral region coincide with each other in the radial direction, and the peak of the first protruding surface is positioned at a center of the first outer peripheral surface in an axial direction of the top ring.

12. The piston ring combination according to claim 2, wherein, in relation to both of the pair of third outer peripheral surfaces, the peripheral edge of the third outer peripheral region on the crankcase side is positioned more outward in the radial direction than the peripheral edge on the combustion chamber side, and the peak of the third protruding surface is positioned closer to the crankcase than the center of the third outer peripheral surface in the axial direction of the oil ring.

13. The piston ring combination according to claim 2, wherein the third outer peripheral region includes, between the third protruding surface and the peripheral edge on the combustion chamber side, a curved surface that is, in the cross-section perpendicular to the circumferential direction of the oil ring, curved outward into a convex shape in the radial direction of the oil ring, the curved surface having a diameter that is gradually reduced toward the combustion chamber side.

14. The piston ring combination according to claim 2, wherein the third outer peripheral region includes, between the third protruding surface and the peripheral edge on the combustion chamber side, a tapered surface that has a diameter that is gradually reduced toward the combustion chamber side.

15. The piston ring combination according to claim 2, wherein, of the second outer peripheral surface, a peripheral edge of the second outer peripheral region on the crankcase side is positioned more outward in the radial direction than a peripheral edge on the combustion chamber side, and the peak of the second protruding surface is positioned closer to the crankcase than a center of the second outer peripheral surface in an axial direction of the second ring.

16. The piston ring combination according to claim 15, wherein the second outer peripheral region includes, between the second protruding surface and the peripheral edge on the combustion chamber side, a curved surface that is, in the cross-section perpendicular to the circumferential direction of the second ring, curved outward into a convex shape in the radial direction of the second ring, the curved surface having a diameter that is gradually reduced toward the combustion chamber side.

17. The piston ring combination according to claim 15, wherein the second outer peripheral region includes, between the second protruding surface and the peripheral edge on the combustion chamber side, a tapered surface that has a diameter that is gradually reduced toward the combustion chamber side.

18. The piston ring combination according to claim 2, wherein, of the first outer peripheral surface, a peripheral edge of the first outer peripheral region on the crankcase side is positioned more outward in the radial direction than a peripheral edge on the combustion chamber side, and the peak of the first protruding surface is positioned closer to the crankcase than a center of the first outer peripheral surface in an axial direction of the top ring.

19. The piston ring combination according to claim 18, wherein the first outer peripheral region includes, between the first protruding surface and the peripheral edge on the combustion chamber side, a curved surface that is, in the cross-section perpendicular to the circumferential direction of the top ring, curved outward into a convex shape in the radial direction of the top ring, the curved surface having a diameter that is gradually reduced toward the combustion chamber side.

20. The piston ring combination according to claim 15, wherein, of the first outer peripheral surface, a peripheral edge on the crankcase side and a peripheral edge on the combustion chamber side of the first outer peripheral region coincide with each other in the radial direction, and the peak of the first protruding surface is positioned at a center of the first outer peripheral surface in an axial direction of the top ring.

21. The piston ring combination according to claim 1, wherein of the second outer peripheral surface, a peripheral edge of the second outer peripheral region on the crankcase side and a peripheral edge of the second outer peripheral region on the combustion chamber side coincide with each other in the radial direction, and the peak of the second protruding surface is positioned at a center of the second outer peripheral surface in the axial direction.

22. The piston ring combination according to claim 2, wherein of the second outer peripheral surface, a peripheral edge of the second outer peripheral region on the crankcase side and a peripheral edge of the second outer peripheral region on the combustion chamber side coincide with each other in the radial direction, and the peak of the second protruding surface is positioned at a center of the second outer peripheral surface in the axial direction.

* * * * *